US008633011B2

(12) United States Patent
Palmer et al.

(10) Patent No.: US 8,633,011 B2
(45) Date of Patent: Jan. 21, 2014

(54) BIOMASS PRODUCTION AND PROCESSING AND METHODS OF USE THEREOF

(75) Inventors: Miles Palmer, Great Falls, VA (US); Bart R. Reid, Imperial, TX (US)

(73) Assignee: Palmer Labs, LLC, Durham, NC (US)

( * ) Notice: Subject to any disclaimer, the term of this patent is extended or adjusted under 35 U.S.C. 154(b) by 686 days.

(21) Appl. No.: 12/726,125

(22) Filed: Mar. 17, 2010

(65) Prior Publication Data

US 2010/0240114 A1   Sep. 23, 2010

Related U.S. Application Data

(60) Provisional application No. 61/161,294, filed on Mar. 18, 2009.

(51) Int. Cl.
*C12N 1/12* (2006.01)

(52) U.S. Cl.
USPC ........................................ 435/257.1; 435/946

(58) Field of Classification Search
None
See application file for complete search history.

(56) References Cited

U.S. PATENT DOCUMENTS

| | | |
|---|---|---|
| 3,403,471 A | 10/1968 | Clement et al. |
| 3,650,068 A | 3/1972 | Meyer et al. |
| 3,969,249 A | 7/1976 | Dodd |
| 4,043,903 A | 8/1977 | Dor |
| 4,044,500 A | 8/1977 | Hitzman |
| 4,209,943 A | 7/1980 | Moeller et al. |
| 4,324,067 A | 4/1982 | Kessler |
| 4,324,068 A | 4/1982 | Anthony |
| 4,438,591 A | 3/1984 | Kessler |
| 4,695,384 A | 9/1987 | Ripl et al. |
| 4,869,017 A | 9/1989 | Bird et al. |
| 4,958,460 A | 9/1990 | Nielson et al. |
| 5,173,828 A | 12/1992 | Tanzer et al. |
| 5,309,672 A | 5/1994 | Spencer et al. |
| 5,527,456 A | 6/1996 | Jensen |
| 5,534,417 A | 7/1996 | Arad et al. |
| 5,573,669 A | 11/1996 | Jensen |
| 5,591,341 A | 1/1997 | Jensen |
| 5,648,313 A | 7/1997 | Pohl |
| 5,661,017 A | 8/1997 | Dunahay et al. |
| 5,715,774 A | 2/1998 | Adey et al. |
| 5,843,762 A | 12/1998 | Moll |
| 5,846,423 A | 12/1998 | Jensen |
| 5,951,875 A | 9/1999 | Kanel et al. |
| 5,981,271 A | 11/1999 | Doucha et al. |
| 6,477,841 B1 | 11/2002 | Yantovsky |
| 6,555,500 B1 | 4/2003 | Unkefer et al. |
| 6,572,770 B1 | 6/2003 | Stewart, III et al. |
| 6,579,714 B1 | 6/2003 | Hirabayashi et al. |
| 6,648,949 B1 | 11/2003 | Der et al. |
| 6,858,430 B1 | 2/2005 | Reddy et al. |
| 6,986,323 B2 | 1/2006 | Ayers |
| 7,007,616 B2 | 3/2006 | Abrams et al. |
| 7,080,478 B2 | 7/2006 | Levy |
| 7,135,308 B1 | 11/2006 | Bush et al. |
| 7,191,736 B2 | 3/2007 | Goldman |
| 7,208,318 B2 | 4/2007 | Hain et al. |
| 7,267,773 B2 | 9/2007 | Jensen et al. |
| 7,314,561 B2 | 1/2008 | Jensen et al. |
| 7,331,178 B2 | 2/2008 | Goldman |
| 7,449,313 B2 | 11/2008 | Rush |
| 7,507,554 B2 | 3/2009 | Bush et al. |
| 7,514,247 B2 | 4/2009 | Rush |
| 2004/0144338 A1 | 7/2004 | Goldman |
| 2004/0168648 A1 | 9/2004 | Ayers |
| 2005/0120624 A1 | 6/2005 | Levy |
| 2005/0170479 A1 | 8/2005 | Weaver et al. |
| 2006/0030489 A1 | 2/2006 | Northcott et al. |
| 2007/0264708 A1 | 11/2007 | Bayless et al. |
| 2008/0000436 A1 | 1/2008 | Goldman |
| 2008/0096267 A1 | 4/2008 | Howard et al. |
| 2008/0155890 A1 | 7/2008 | Oyler |
| 2008/0178581 A1 | 7/2008 | Nishimoto et al. |
| 2008/0188676 A1 | 8/2008 | Anderson et al. |
| 2008/0223011 A1 | 9/2008 | Shonnard |
| 2008/0223303 A1 | 9/2008 | Mouzakitis et al. |
| 2008/0228542 A1 | 9/2008 | Iwai et al. |
| 2008/0245052 A1 | 10/2008 | Boyce et al. |
| 2008/0250780 A1 | 10/2008 | Fromson |
| 2008/0250791 A1 | 10/2008 | Fromson |
| 2008/0268302 A1 | 10/2008 | McCall |
| 2008/0274494 A1 | 11/2008 | Kertz |
| 2008/0299643 A1 | 12/2008 | Howard et al. |

(Continued)

FOREIGN PATENT DOCUMENTS

| | | |
|---|---|---|
| WO | WO 00/57105 | 9/2000 |
| WO | WO 2005 051073 | 6/2005 |

OTHER PUBLICATIONS

Information Sheet: Stoneworts. *Centre for Ecology & Hydrology*, Centre for Aquatic Plant Management, 2004, pp. 1-2, www.capm.org.uk.

Benemann, "Opportunities and Challenges in Algae Biofuels Production," *A Position Paper by Dr. John R. Benemann in Line with Algae World 2008*, Sep. 2008, pp. 1-15.

Chisti, "Biodiesel From Microalgae," *Biotechnology Advances*, 2007, pp. 294-306, vol. 25.

Coops, Editorial: "Ecology of Charophytes: an Introduction," *Aquatic Botany*, 2002, pp. 205-208, vol. 72.

(Continued)

*Primary Examiner* — Debbie K Ware
(74) *Attorney, Agent, or Firm* — Womble Carlyle Sandridge & Rice, LLP

(57) ABSTRACT

The present invention provides methods and systems for the production of macroalgae in a manner to provide a sustained, economical source of biomass that may be used in various end-use processes, including energy production. The invention provides specific combinations of macroalgae types, saltwater growth medium compositions, and open pond water containers that results in biomass production beyond what may occur naturally without the required manipulation. Specifically, macroalgae that produce an exoskeleton in the presence of brackish water (e.g., stoneworts) have been found to provide excellent biomass production under the conditions of the invention.

65 Claims, 1 Drawing Sheet

(56) References Cited

U.S. PATENT DOCUMENTS

| | | |
|---|---|---|
| 2009/0029445 A1 | 1/2009 | Eckelberry et al. |
| 2009/0035835 A1 | 2/2009 | Slavin |
| 2009/0049748 A1 | 2/2009 | Day et al. |
| 2009/0069610 A1 | 3/2009 | Roberts, IV et al. |
| 2009/0071064 A1 | 3/2009 | Machacek et al. |
| 2009/0077864 A1 | 3/2009 | Marker et al. |
| 2009/0077892 A1 | 3/2009 | Shulenberger et al. |
| 2009/0078175 A1 | 3/2009 | Eiteneer et al. |
| 2009/0081748 A1 | 3/2009 | Oyler |
| 2009/0113790 A1 | 5/2009 | Erd |
| 2009/0130706 A1 | 5/2009 | Berzin et al. |
| 2009/0130747 A1 | 5/2009 | Wen-Teng et al. |
| 2009/0148927 A1 | 6/2009 | Schroeder et al. |
| 2009/0151240 A1 | 6/2009 | Kayama et al. |
| 2009/0151241 A1 | 6/2009 | Dressler et al. |
| 2009/0159010 A1 | 6/2009 | Spartz |
| 2009/0197322 A1 | 8/2009 | Goldman |
| 2009/0203067 A1 | 8/2009 | Eckerle et al. |
| 2009/0215155 A1 | 8/2009 | Cloud et al. |
| 2009/0221057 A1 | 9/2009 | Kennedy |
| 2009/0227003 A1 | 9/2009 | Blotsky et al. |

OTHER PUBLICATIONS

Crawford, "Chemical, Physical and Biological Changes Associated with Chara Succession in Farm Ponds," *Hydrobiologia*, 1977, pp. 209-217, vol. 55, No. 3.

Forsberg, "Phosphorus, a Maximum Factor in the Growth of Characeae," *Nature*, 1964, pp. 517-518, vol. 201, No. 4918.

Gao et al, "Use of Macroalgae for Marine Biomass Production and $CO_2$ Remediation: A Review," *Journal of Applied Phycology*, 1994, pp. 45-60, vol. 6.

Hilderbrand, JR., "Preparation of Salt Brines for the Fishing Industry," *Oregon Sea Grant—Oregon State University*, 1998.

Kirst et al., "Ecophysiological Investigations of *Chara vulgaris* L. Grown in a Brackish Water Lake: Ionic Changes and Accumulation of Sucrose in the Vacuolar Sap During Sexual Reproduction," *Plant, Cell and Environment*, 1988, pp. 55-61, vol. 11.

Mann, "Towards a Biography of North American Charophytes," *Australian Journal of Botany*, 1999, pp. 445-458, vol. 47.

Proctor, "Characeae of Llano Estacado (Texas and Adjacent New Mexico) Playas," *Journal of Biogeography*, 1990, pp. 75-84, vol. 17.

Ross et al., "Classification of Macroalgae as Fuel and its Thermochemical Behaviour," *Bioresource Technolosly, ScienceDiet*, 2008, pp. 6494-6504, vol. 99.

Turmel et al., "The Chloroplast Genome Sequence of *Chara vulgaris* Sheds New Light Into the Closest Green Algal Relatives of Land Plants," *Mol. Biol. Evol.* 2006, pp. 1324-1338, vol. 23, No. 6.

Wood, "The Characeae," *The Botanical Review*, 1952, pp. 317-353, vol. XVIII, No. 5.

Andrews et al., "Culture of *Chara-hispida*," *British Phycological Journal*, 1984, pp. 277-280, vol. 19, No. 3.

Blake et al., "Comparative Growth Rates and internal Banding Periodicity of Maerl Species (Corallinales, Rhodophyta) From Northern Europe," *Phycologia, Blackwell Scientific Publ.*, 2003, pp. 606-612, vol. 42, No. 6.

Blunden et al., "Commercial Collection and Utilization of Maerl," *Economic Botany, New York Botanical Gorden.* 1975, pp. 141-145, vol. 29, No. 2.

Briand et al., "Seaweed Harvesting in Europe," *Seaweed Resources in Europe: Uses and Potential, Chichester*, 1991, pp. 259-308.

Friedlander et al., "Cultivation of Gracilaria in Outdoor Tanks and Ponds," *Journal of Applied Phycology*, 1995, pp. 315-324, vol. 7, No. 3.

Hunt et al., "A New, Artificial Seawater That Facilitates Growth of Large Numbers of Cells of *Acetabularia acetabulum* (Chlorophyta) and Reduces the Labor Inherent in Cell Culture," *Journal of Phycology*, 1996, pp. 483-495, vol. 32, No. 3.

Israel et al., "Experimental Tank Cultivation of Porphyra in Israel," *Journal of Applied Phycology*, 2006, pp. 235-240, vol. 18, No. 3-5.

Kangwe et al., "Heavy Metal Inhibition of Calcification and Photosynthetic Rates of a Geniculate Calcareous Alga Amphiroa Tribulus," *Proceedings of the $20^{th}$ Anniversary Conference on Advances in Marine Science in Tanfania*, 2001, pp. 147-157.

Kiegle et al., "Plasma Membrane Na+ Transport in a Salt-Tolerant Charophyte," *Plant Physiology*, 1996, vol. III, No. 4.

Lapointe et al., "The Mass Outdoor Culture of Macroscopic Marine Algae," *Aquaculture*, 1976, pp. 9-21, vol. 8, No. 1.

Lee et al., "Correlation of Decreased Calcium Contents with Proline Accumulation in the Marine Green Macroalga *Ulva fasciata* Exposed to Elevated NaCl Contents in Seawater," *Journal of Experimental Botany*, 1999, pp. 1855-1862, vol. 50, No. 341.

Nelson, "Calcified Macroalgae—Critical to Coastal Ecosystems and Vulnerable to Change: a Review," *Marine and Freshwater Research*, 2009, pp. 787-801, vol. 60, No. 8.

Provasoli et al., "The Development of Artificial Media for Marine Algae," *Archives of Microbiology*, 1957, pp. 392-428, vol. 25, No. 1.

Siong et al., "Does Caccite Encrustation in *Chara* Provide a Phosphorus Nutrient Sink?," *Journal of Environmental Quality*, 2006, pp. 490-494, vol. 35, No. 2.

BIOMASS PRODUCTION AND PROCESSING AND METHODS OF USE THEREOF

CROSS-REFERENCE TO RELATED APPLICATIONS

The present application claims priority to U.S. Provisional Patent Application No. 61/161,294, filed Mar. 18, 2009, the disclosure of which is incorporated herein by reference in its entirety.

FIELD OF THE INVENTION

This invention relates to a system and process for biomass production, processing, and use. More specifically, the invention relates to methods of producing algae, in particular macroalgae, in a scale suitable for multiple end uses, including but not limited to power generation, biofuel production, and consumption by living organisms.

BACKGROUND

Growing concerns related to environmental sensitivity and ever increasing costs associated with all aspects of life in the twenty-first century form the basis for a never-ending search for replacements for current energy sources. The debate over availability of fossil fuels as a continuing energy source for electrical power production and for automotive fuels likely is made moot by volatility in production locations, price fluctuations, and increasing demand with a growing world population and increasing industrialization. Growing populations also further stress availability of sufficient nutrition worldwide, particularly when land-based food crops are displaced by crops intended for biofuel production (e.g., corn and sugar cane) as a possible replacement (or at least an extender) for fossil fuels.

To solve the foregoing problems in a society turning toward a philosophy of renewability, some have turned to algae as a possible fuel source. Simply stated, algae are photosynthetic organisms that use solar energy to combine water and carbon dioxide to produce organic materials, i.e., biomass. In general, there are two basic types of algae that are recognized in the field—microalgae and macroalgae. These two types of algae are distinctly different, botanically speaking, and have distinct characteristics, and hence usefulness, as biomass sources.

Microalgae (or microphytes) typically are recognized as unicellular species which exist individually or in chains or groups. Depending on the species, their sizes can range from a few micrometers to a few hundreds of micrometers. Unlike higher plants, microalgae do not have roots, stems, and leaves. Microalgae exhibit great biodiversity, and it has been estimated that about 200,000-800,000 species exist, of which about 35,000 species are described.

To date, research and development directed to fuel production using algae biomass has centered on microalgae as the algae of choice, typically because of the high oil content in many species of microalgae. Typically, research around the use of microalgae as a biomass source has focused on turning the microalgae into fuel or electrical energy via transesterification to biodiesel, fermentation to ethanol or methane, gasification to methane or hydrogen, pyrolysis to gas/liquid fuels, and burning to create heat or electricity. Many sources indicate that the creation of biodiesel from microalgae is the most promising use since subsidies on biodiesel are very high worldwide, and biodiesel is in general seen as a clean fuel. Also the process of producing diesel from biomass with lipids by transesterification is becoming well established. Methane production from microalgae is possible by fermentation, pyrolysis, or gasification but, at the present time, gasification typically is viewed as the most efficient process (because most of the biomass is converted into methane), although fermentation is cheaper to perform. To make microalgae a viable source of biomass, they must be produced in large volume, which has proven difficult. Ideal conditions for microalgae growth can be created in a laboratory; however, the costs to create these conditions are exceedingly high, and it is very difficult to scale up the laboratory environment efficiently.

There currently are two distinct methods being used for cultivation of microalgae. One method makes use of a raceway pond, which is a large open water raceway track where microalgae and nutrients are circulated around the pond track through use of a motorized paddle. With addition of carbon dioxide to the pond, it has been possible to grow microalgae, and the biggest advantage of these open ponds is their simplicity, yielding low production costs and low operating costs. Many algae species, however, cannot be grown in these ponds due to contamination, such as by other algae and bacteria. Also the process conditions, such as temperature and light, are hard or impossible to control.

The second method currently being used to grow microalgae is the photobioreactor. Unlike raceway ponds, this is a closed system with a controlled light source. Although use of the photobioreactor provides control over growth conditions, operation and production costs of photobioreactors are much higher due to the requirement for more complicated technology.

There are several advantages associated with the use of algae in general as a biomass energy source. For example, in many processes, converting algae biomass to energy can be substantially neutral with regard to carbon dioxide, and the fact that algae can use carbon dioxide and other flue gasses to grow has made them a growing subject of research. Furthermore, algae are a sustainable source of energy, and the basic requirements for algae growth (i.e., carbon dioxide, water, and sunlight) are available in abundance (particularly since freshwater is not necessarily required). Another advantage to use of algae is their highly efficient conversion of solar energy to biomass, particularly compared to typical land crops or trees. It is possible for algae to use almost 10% of the incoming sunlight for the photosynthesis process, and this can allow for a high biomass output per square meter per day. The problem in the art has been identifying all of the variables necessary to achieve a sustainable, high biomass output.

Widescale use of microalgae as a biomass source has been limited to date, and this primarily arises from the inability to grow mass cultures of microalgae at a competitive price. To earn maximum growth per square meter, a photobioreactor has been necessary, and such photobioreactors are extremely expensive compared to the traditional open pond systems. The open pool systems, however, have not been a viable option to date because it is hard, if not impossible, to control the growth process of the microalgae in the open environment. To date, only a few algae species have been identified as possible candidates for open pool growth systems because there are only a few species that lack detrimental sensitivity to contamination, and these species are often not the most efficient converters of sunlight and carbon dioxide to biomass. Besides the fact that growing algae is not economically viable at the moment, the conversion is not optimal as well. Because algae are wet they cannot be gasified without drying, which consumes a lot of energy and therefore lowers the overall efficiency. Supercritical water gasification has been proffered as a possible a solution, but it has not been successfully applied on a large scale. One extensive research initiative (see Golueke, C. and Oswald, W., 1968, "Power from Solar Energy via Algae-Produced Methane," *Solar Energy,* 7(3), pp. 86-92) around conversion with fermentation arrived at the conclusion that 1.5 kWh of electrical energy per kg of algae could be produced by algae anaerobic fermentation and burning of the produced methane. With already established open pool growth rates of 10 grams/m²/hour, this would yield 15 W/m², which means that the total electricity production of the Netherlands could be produced with 18,000 km² of algae farms—about 45% of the total surface area of the Netherlands, which is of course not viable. These calculations only took into account the area needed to grow the algae, not the processing of the algae to methane. This represents only some of the problems to date associated with algae biomass production that is economically viable and technologically sound.

In a Position Paper by John R. Benemann ("Opportunities and Challenges in Algae Biofuels Production, September 2008), it was concluded that the cultivation of microalgae for biofuels in general and oil production in particular is not yet a commercial reality and, outside some niche, but significant, applications in wastewater treatment, still requires relatively long-term R&D, with emphasis currently more on the R rather than the D. Mr. Benemann states that this is due in part to the high costs of even simple algae production systems (e.g., open, unlined ponds), and in even larger part to the undeveloped nature of the required algal mass culture technology, from the selection and maintenance of algal strains in the cultivation systems, to achievement of high productivities of biomass with a high content of vegetable oils, or other biofuel precursors. Mr. Benemann also made the following observation. Assuming a currently achievable yield of about 50 metric tons per hectare per year biomass with 25% oil content (as triglycerides useful for biodiesel), or a yield of about 14,000 liters of oil per hectare per year, even assuming a $1/liter selling price, this would not be sufficient to cover the optimistic estimated capital costs (depreciation, return on capital, and other fixed costs), let alone any operating costs. He concludes that this clearly requires a major improvement in the productivity of such systems, with a doubling or even tripling in outputs of what is currently possible.

Considering all of the limitations associated with the potential use of microalgae as a biomass source, it is not surprising that macroalgae has not to date been given serious consideration as a possible biomass source. Specifically, it has been understood in the prevailing literature that macroalgae are not a reliable and useful biomass source. For example, macroalgae have been considered of little use because of the low macroalgae growth rate in comparison to the enormous short term growth rate of microalgae. Macroalgae also have been considered of little use because its low oil content relative to microalgae has hindered efficient production of oil derived biofuels.

Successfully growing algae of any type has been hindered to date because the rapidly growing algae are known to deplete the carbon dioxide in the growth medium (i.e., water), and this presents the requirement for supplementing the carbon dioxide from artificial sources to maintain growth rate. Disadvantages of algae use as a biomass source further are complicated by the difficulty and expense in separating algae from the aqueous growth medium and the difficulty and expense in separating the oil fraction from the algae. These and further shortcomings in the art are overcome by the present invention.

SUMMARY OF THE INVENTION

Embodiments of the present invention overcomes the known problems in the art around the use of algae as a biomass source for ultimate energy production through the careful identification of specific cultivation techniques that enable production of algae on a useful and economical scale. Accordingly, in various embodiments, the present invention provides methods of producing macroalgae, as well as specific macroalgae production systems.

In one embodiment, the invention can provide a method of producing macroalgae comprising growing the macroalgae in an open pond system. Specifically, the open pond system can comprise a saltwater growth medium having a pH of at least about 7.5, and a calcium content of at least about 500 mg/L. In some embodiments, the growth medium can be characterized in terms of the ratio of calcium to the other primary components—sodium and chlorine from the main salt component of the water. In specific embodiments the growth medium can have a content of sodium and chlorine such that the ratio of the combination of sodium and chlorine to the calcium in the saltwater growth medium is greater than 0 but less than about 50. In other words, the growth medium is still a saltwater per se, but it has a much higher proportion of calcium (e.g., such as from calcium bicarbonate) than known macroalgae growth mediums.

The macroalgae used in the invention can vary but preferably is taken from a defined group of macroalgae. For example, the macroalgae can be a macroalgae classified in the order Charales. In other embodiments, the macroalgae can be a macroalgae classified in the family Characeae or Clavatoraceae. In still other embodiments, the macroalgae can be a macroalgae classified in a specific genus or may be selected from a specific list of species. A detailed discussion of the types of macroalgae that may be used according to the invention is provided herein. In specific embodiments, the macroalgae can be defined in relation to certain characteristics rather than a strict classification system. For example, the macroalgae can be a soil-rooting species. In other embodiments, the macroalgae can be a macroalgae that forms a calcium carbonate-containing exoskeleton in the presence of sufficient calcium ions and carbonate ions. Thus, the macroalgae may be a species recognized by one or more of the common names stonewort, brittlewort, muskgrass, and muskwort.

The open pond system used in the inventive methods can have specific characteristics that provide for the excellent results provided by the invention. For example, the open pond system may comprise soil having a pH of at least about 7.5.

Similarly, the saltwater growth medium can have specific characteristics that contribute to the invention. For example, in addition to the specific pH and calcium content, the saltwater growth medium can have a specific sulfate content, such as at least about 1,000 mg/L. Further, the saltwater growth medium can have a specific nitrogen content, such as at least about 6 mg/L. Still further, the saltwater growth medium can have a specific phosphorus content, such as at least about 0.5 mg/L. In one embodiment, the saltwater growth medium can have the following composition: a sodium chloride content of about 3 g/L to about 70 g/L; a calcium content of about 500 mg/L to about 50 g/L; a sulfate content of about 1 g/L to about 16 g/L; a nitrogen content of about 6.25 mg/L to about 100 mg/L; a silicon content of about 1.5 mg/L to about 24 mg/L; a phosphorus content of about 0.5 mg/L to about 8 mg/L; and an iron content of about 0.5 mg/L to about 8 mg/L. Moreover, the saltwater growth medium can be characterized by its total salinity. In some embodiments, the growth medium can have a total salinity of at least about 1% by weight or can be in the range of about 1.5% to about 15% by weight. In specific embodiments, the above compositions can be achieved through addition of specific nutrients and secondary chemicals that can directly or indirectly contribute to the chemical composition of the growth medium. For example, in specific embodiments, the inventive methods can include adding a hydroxide compound to the saltwater growth medium.

In specific embodiments, conditions are selected such that the method of producing macroalgae comprises forming a calcium carbonate-containing exoskeleton on at least a portion of the external surface of the macroalgae such that the macroalgae comprise a plant portion and a calcium carbonate-containing exoskeleton portion. This characteristic becomes highly relevant in relation to methods of harvesting of the macroalgae.

In certain embodiments, harvesting can comprise removing only a portion of the individual macroalgae plants leaving the rooting portion of the macroalgae in place in a majority of the individual plants. In other embodiments, harvesting can comprise separating the upper portion of the macroalgae from the rooting portion of the macroalgae at some point below the surface of the saltwater growth medium. Specifically, harvesting can comprise removing an average of about 10% to about 50% of the mass of the macroalgae.

In some embodiments, harvesting is carried out only when specific conditions are met. For example, harvesting can be carried out when the average shading factor in the open pond system is about 25% to about 75%. The effect of shading factor is further described herein.

In specific embodiments, the production method can comprise separating the calcium carbonate-containing exoskeleton portion from the plant portion of the macroalgae. The calcium carbonate can be recycled for various uses, including as a chemical additive to a macroalgae growth medium, such as in an open pond system. In some embodiments, the methods of the invention also can comprise directing the plant portion of the macroalgae to an end-use process.

The open pond system used in the invention can have specific characteristics that are useful in achieving the desired macroalgae growth. For example, the saltwater growth medium in the open pond system can have a specified depth, such as at least about 2 feet, or a depth of about 2 feet to about 8 feet. Further, the open pond system may comprise light sensors, optical sensors, or other sensing equipment interspaced therein. Other attributes of the open pond system are further described herein.

In further embodiments, the methods of the invention can be described in relation to the unique combination of process steps that heretofore have not be recognized in the art. For example, in certain embodiments, the invention can be directed to a method of producing macroalgae comprising the following steps: growing a soil-rooting, exoskeleton-forming macroalgae in an open pond system such that the macroalgae comprise a plant portion and a calcium carbonate-containing exoskeleton portion; harvesting the macroalgae; and separating the exoskeleton portion from the plant portion of the macroalgae. Any macroalgae as described herein could be used according to such embodiments. Likewise, soil conditions and saltwater growth conditions as otherwise described herein could be employed according to these embodiments.

According to such embodiments, the inventive method can include further steps. For example, the method can comprise directing the plant portion of the macroalgae to an end-use process. Also, the method could comprise recycling at least a portion of the calcium carbonate-containing exoskeleton into a saltwater growth medium in an open pond system growing macroalgae.

In other embodiments, the invention can provide a macroalgae production system. In specific embodiments, such a system can comprise the following: a saltwater growth medium container having therein a soil component having a pH of at least about 7.5; actively growing macroalgae at least partially rooted in the soil component; and a saltwater growth medium having a specified composition as described herein. In specific embodiments, the growth medium can have pH of at least about 7.5, a calcium content of at least about 500 mg/L, and a content of sodium and chlorine such that the ratio of the combination of sodium and chlorine to the calcium in the saltwater growth medium is greater than 0 but less than about 50. Again, any of the macroalgae described herein could be used in the production system of the invention.

In further embodiments, the macroalgae production system can comprise additional components. For example, the macroalgae production system can include light sensors, optical sensors, or other like sensing devices interspaced within the saltwater growth medium container. In still further embodiments, the production system can comprise a macroalgae harvesting device that separates an upper portion of the actively macroalgae from a rooting portion of the macroalgae at some point below the surface of the saltwater growth medium. Moreover, the production system can comprise a separator for separating any calcium carbonate-containing exoskeleton on the external surface of the macroalgae from the plant portion of the macroalgae. Even further components for processing the macroalgae after harvesting could be included in the macroalgae production system of the invention.

BRIEF DESCRIPTION OF THE DRAWINGS

Figure 1:
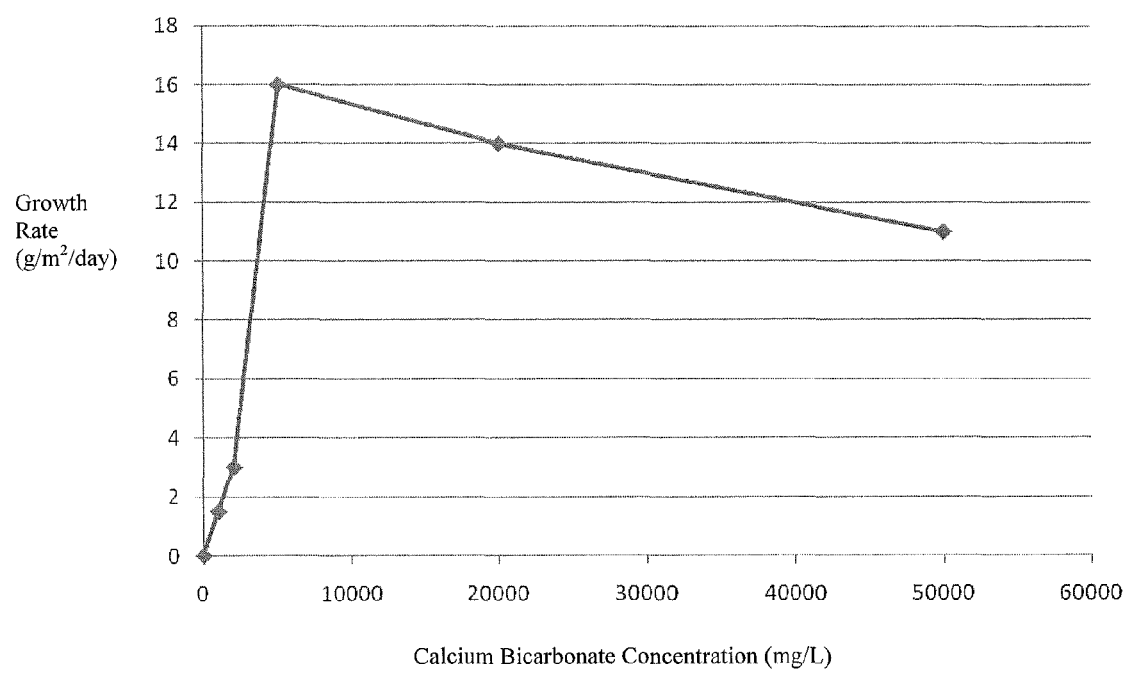

Having thus described the invention in general terms, reference will now be made to the accompanying FIG. 1, which is a graph showing the growth rate of *Chara vulgaris* macroalgae in a saltwater growth medium with varying calcium carbonate concentrations.

DETAILED DESCRIPTION OF THE INVENTION

The invention now will be described more fully hereinafter through reference to various embodiments. These embodiments are provided so that this disclosure will be thorough and complete, and will fully convey the scope of the invention to those skilled in the art. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present invention provides methods and systems for producing macroalgae in a renewable, reliable, mass sufficient, and cost-effective manner. The macroalgae biomass provided according to the invention can be directed to a wide variety of beneficial end uses. For example, the macroalgae biomass may be used as a fuel for power generation, as a raw product to produce biofuel, or as a food source (e.g., as all or part of an animal feed product).

As pointed out above, algae have been researched for some time in relation to their use in energy production in one form or another. Many in the field have keyed upon microalgae as the biomass source, typically because of their large, relative oil content (e.g., around 20% by weight) and their very fast growth rate potential. Unfortunately, microalgae only become useful as a biomass source under tightly controlled growth conditions. This appears to arise from the sensitivity of microalgae to competitors (e.g., bacteria and natural consumers of the microalgae). Moreover, because of their micro size, highly specialized techniques are being developed and refined to minimize the land surface area needed to grow a sufficient mass of the microalgae to be a useful and economical biomass source. As experts in the field have noted, there is no successful microalgae biomass production system that can rival other energy sources.

In light of the desirable qualities of microalgae (oil content and rapid growth), and despite the considerable hurdles to effective microalgae biomass product, most in the field have paid little attention to macroalgae as a viable biomass source for energy production. The present invention, however, can provide for useful production of macroalgae as a biomass source because of specialized research that has identified specific processes and conditions that allow macroalgae to outperform microalgae in a manner that makes the macroalgae a highly desirable and effective biomass source.

For example, most in the field have disregarded macroalgae in favor of microalgae because of the low growth rate of macroalgae relative to microalgae. Research related to the present invention has unexpectedly identified that although this may be the case under tightly controlled, sterile laboratory conditions, macroalgae growth can significantly exceed microalgae growth in more natural settings. Moreover, the present researchers have been able to overcome the perceived disadvantage to macroalgae related to their lower oil content by identifying methods of energy production using the macroalgae biomass that are not reliant upon oil content alone. For example, it has been found that under defined conditions, the macroalgae can be directly combusted as a fuel source rather than being converted to a separate fuel source, such as biodiesel or methane.

Through careful research and experimentation, the present advancement in the art has been achieved particularly through identification of components, factors, and conditions that expand upon the natural order of macroalgae and move it from classification as a mere seaweed or even a pest or nuisance plant to classification as a desirable and highly useful biomass resource. By identifying the proper macroalgae types, the proper growing conditions, and the proper cultivation techniques, the present invention is able to overcome the many limitations in the art around the use of algae as an effective and even profitable biomass source.

I. Macroalgae

In certain aspects, the many advantages provided by the present invention can arise from the choice of macroalgae used in a biomass production method and system. Although certain conditions are described herein that can allow for the use of a wide variety of macroalgae species (as well as sub-species, varieties, forms, and cultivars thereof), it has been found according to the present invention that increased benefit can be derived from the use of specific types of macroalgae, particularly macroalgae that are well-suited for cultivation under conditions that may otherwise be deemed inhospitable to algae.

As would be recognized by a skilled person, macroalgae can be identified according to a specific botanical classification system. Thus, in certain embodiments, the macroalgae that may be used according to the present invention can be described based upon their specific classification.

In some embodiments, macroalgae useful according to the present invention can include those macroalgae in the phylum or division Chlorophyta or Charophyta. In other embodiments, macroalgae useful according to the present invention can include those macroalgae in the class Charophyceae. In specific embodiments, macroalgae useful according to the present invention can include those macroalgae in the order Charales.

The green algae in the order Charales commonly may be called stoneworts or brittleworts, as well as muskgrass or muskwort. These common names can arise from certain distinct characteristics of the plants, such as the brittle, limestone (calcium carbonate) exoskeleton that can form on the external surfaces of the plant (particularly the thallus) in the presence of hard or brackish water, as well as the distinctive smell of stale garlic emitted by the plant when crushed. Algae of the order Charales can be found in a variety of water habitats and are found on all continents except Antarctica. The thallus of the plant typically consists of a series of so-called "giant cells" up to several cm in length, with branches coming off at nodes composed of smaller cells. Growth occurs at the apex, and the plant typically is anchored rooted in soil, mud, or silt by translucent rhizoids (or roots). Male and female sexual reproductive structures grow at the nodes. The male antheridia are spherical and often orange. The female oogonia are oblong, consisting of a central cell jacketed by five tubular, spiraling cells. A crown of smaller cells sits atop the jacket cells where they come together.

In further embodiments, macroalgae useful according to the present invention can include those macroalgae classified in the family Characeae or Clavatoraceae. In particular embodiments, macroalgae useful according to the invention include the use of a genus in the family Characeae. While any macroalgae in the family Characeae may be used according to the invention, in certain embodiments, the macroalgae may be of a genus selected from the group consisting of *Aclistochara, Amblyochara, Amphorochara, Chara, Charites, Croftiella, Gobichara, Grambastichara, Grovesichara, Gyrogona, Harrisichara, Hornichara, Lamprothamnium, Lamprothamnus, Latochara, Lychnothamnus, Maedleriella, Maedlerisphaera, Mesochara, Microchara, Multispirochara, Nemegtichara, Neochara, Nitella, Nitellopsis, Nodosochara, Obtusochara, Peckichara, Peckisphaera, Piriformachara, Platychara, Raskyaechara, Sphaerochara, Stephanochara, Tectochara, Tolypella*, and combinations thereof.

In particularly preferred embodiments, macroalgae of the genus *Chara* may be useful according to the invention. Members of the *Chara* genus typically are green or gray-green in color and grow completely submersed in shallow to deep water (e.g., from about 4 cm to about 20 m). Individuals can vary greatly in size, ranging from about 5 cm to about 1 m in length. The main stem of *Chara* macroalgae usually bear whorls of branchlets clustered at regularly spaced joints. When growing in the presence of sufficient calcium (more particularly sufficient calcium ions and sufficient carbonate ions), members of the *Chara* genus can become coated with lime, giving them a rough gritty feel (i.e., the roughness arising from the protective exoskeleton formed of calcium carbonate). Typical of members of the Charales order, macroalgae from the *Chara* genus may be identifiable by their strong skunk-like or garlic odor, especially evident when crushed.

Any macroalgae belonging to the *Chara* genus (i.e., any *Chara* species) may be used in the methods and systems of the present invention. In specific embodiments, the macroalgae may be selected from the group consisting of *Chara aculeolata, Chara alopecuroidea, Chara alopecuroides, Chara*

*angarica, Chara arrudensis, Chara aspera, Chara asperula, Chara australis, Chara baltica, Chara batrachioides, Chara batrachosperma, Chara baueri, Chara benthamii, Chara bharadwajee, Chara biformis, Chara brachypus, Chara braunii, Chara bulbillifera, Chara canescens, Chara capillacea, Chara capillaris, Chara capitata, Chara ceratophylla, Chara chidamuensis, Chara columnaria, Chara congesta, Chara conimbrigensis, Chara connivens, Chara connivetifragilis, Chara contraria, Chara corallina, Chara coronata, Chara crassicaulis, Chara crinita, Chara curta, Chara delicatula, Chara denudata, Chara desmacantha, Chara dichopitys, Chara diffusa, Chara dissoluta, Chara distorta, Chara drummondii, Chara eboliangensis, Chara ecklonii, Chara elongata, chara equisetifolia, Chara escheri, Chara fallax, Chara fibrosa, Chara firma, Chara flexillis, Chara foetida, Chara foliolata, Chara fragifera, Chara fragilifera, Chara fragilis, Chara fulcrata, Chara galioides, Chara gelatinosa, Chara globularis, Chara glomerata, Chara gracilis, Chara gymnophylla, Chara gymnopitys, Chara gymnopus, Chara halina, Chara hansenii, Chara hedwigii, Chara heterophylla, Chara hirta, Chara hispida, Chara hookeri, Chara horrida, Chara huangii, Chara hyalina, Chara hydropytis, Chara imperfecta, Chara inconnexa, Chara inconspicua, Chara inflata, Chara intermedia, Chara intertexta, Chara intricata, Chara krausei, Chara leei, Chara leptopitys, Chara leptosperma, Chara leptospora, Chara lhotzkyi, Chara liljebladii, Chara longibracteata, Chara macropogon, Chara major, Chara major, Chara microphylla, Chara mollusca, Chara montagnei, Chara mucronata, Chara muelleri, Chara muscosa, Chara myriophylla, Chara nolteana, Chara nuda, Chara obtuse, Chara oedophylla, Chara opaca, Chara pachyarthra, Chara palaeofragilis, Chara palaeohungarica, Chara papillata, Chara papulosa, Chara pedunculata, Chara plebeja, Chara polyacantha, Chara polycarpica, Chara polyphylla, Chara polysperma, Chara pouzolsii, Chara preissii, Chara prolifera, Chara psilopitys, Chara pulchella, Chara pusilla, Chara rabenhorstii, Chara refracta, Chara rudis, Chara rusbyana, Chara sadleri, Chara scoparia, Chara setosa, Chara spinescens, Chara squamosa, Chara stelligera, Chara stoechadum, Chara strigosa, Chara stuartiana, Chara submollusca, Chara subtillis, Chara succincta, Chara syncarpa, Chara tenuispina, Chara tenuissima, Chara tomentosa, Chara translucens, Chara trichophylla, Chara vandalurensis, Chara vasiformis, Chara virgata, Chara viridis, Chara visianii, Chara vulgaris, Chara wallichi, Chara wallrothii,* and *Chara zeylanica.* Of course, the foregoing are representative of the *Chara* species that may be used according to the invention, and any further *Chara* species (or other species exhibiting the characteristics suitable for use as described herein) may be used as a biomass source in the methods and systems of the invention. Moreover, the invention also encompasses subspecies, varieties, forms, and cultivars of any useful *Chara* species, as well as combinations thereof.

In certain embodiments, the macroalgae *Chara vulgaris* particularly may be useful according to the invention. It has been found that such macroalgae exhibit all of the desirable characteristics making macroalgae useful biomass sources according to the present invention. Specifically, *Chara vulgaris* form a calcium carbonate exoskeleton in harsh, brackish water and thus are highly resistant to external factors (e.g., bacteria or other organisms that may feed on or otherwise destroy of reduce the lifespan of the algae) that make other algae, particularly microalgae, unsuitable as practical, economical biomass sources. Because *Chara vulgaris* have been found to grow so vigorously under particularly harsh conditions, they also do not suffer from competition by other water plants. As more fully described herein, the present invention has determined specific conditions that surprisingly not only support the types of macroalgae disclosed herein but actually make them flourish beyond expectations known in the art. Because of the characteristics common to the Charophytes, particularly the stoneworts (or members of the Charales order), the invention encompasses macroalgae beyond *Chara vulgaris* and can include any Charophyte exhibiting the properties described herein, as could be easily determined by subjecting representative species from any genus in the Charales order, the Characeae family, or the Clavatoraceae family to growing conditions as described herein and observing the response of the plant thereto. Specifically, the invention can encompass any macroalgae forming a calcium carbonate exoskeleton when grown in high pH, high calcium conditions that typically do not support a variety of plant species. Such conditions are more fully described below. Because the common name stonewort is descriptive of the characteristics making the macroalgae described herein particularly useful according to the invention, that term may be used herein to refer collectively to the numerous species, subspecies, varieties, forms, and cultivars of the Charales order generally, or the *Chara* genus more particularly, that are particularly useful in the methods and systems of the invention. Thus, the invention encompasses all of the macroalgae described above, as well as *Chara vulgaris* specifically, and also subspecies, varieties, forms, and cultivars of *Chara vulgaris*. For example, in specific embodiments, the macroalgae of the invention can be selected from the group consisting of *Chara vulgaris* f. *contraria, Chara vulgaris* var. *refracta, Chara vulgaris* f. *paragymnophylla, Chara vulgaris* f. *subhispida, Chara vulgaris* f. *subinermis, Chara vulgaris* var. *gymnophylla, Chara vulgaris* var. *hispidula, Chara vulgaris* var. *vulgaris, Chara vulgaris* Linnaeus, *Chara vulgaris* var. *montana, Chara vulgaris* f. *crispa, Chara vulgaris* var. *contraria, Chara vulgaris* var. *papillata, Chara vulgaris* f. *longibracteata, Chara vulgaris* var. *longibracteata, Chara vulgaris* var. *crassicaulis, Chara vulgaris* var. *denudata, Chara vulgaris* var. *vulgaris* f. *crassicaulis, Chara vulgaris* var. *inconexa* f. *arrudensis, Chara vulgaris* var. *inconnexa, Chara vulgaris* subsp. *squamosa, Chara vulgaris* f. *hispidula, Chara vulgaris* var. *condensata, Chara vulgaris* var. *imperfecta, Chara vulgaris* var. *oedophylla, Chara vulgaris* var. *vulgaris* f. *muscosa,* and combinations thereof.

In some embodiments, even further types of macroalgae may be useful according to the invention. For example, in the phylum Chlorophyta, macroalgae that may be useful according to the invention include those classified under the class Ulvophyceae, particularly under the order Ulvales, further particularly under the family Ulvaceae, and more particularly under the genus *Ulva*, including species, subspecies, varieties, forms, and cultivars thereof. Other macroalgae that may be useful according to the invention include macroalgae classified in the genus *Padina*, including species, subspecies, varieties, forms, and cultivars thereof.

As noted above, the macroalgae used according to the invention can be generally distinguished from microalgae by the characteristic of including roots (or rhizoids) that anchor the plant to the soil. Thus, distinct from microalgae, the macroalgae used according to the present invention can be described as soil-rooting species of macroalgae. This is a particularly important feature because of the fact that not only are specific water conditions needed to achieve optimum growth, but specific soil conditions also are required. More specifically, the macroalgae used in the present invention are those that grow and flourish in soil conditions (particularly very alkaline conditions) that typically do not well support plants.

II. Saltwater Growth Medium

As macroalgae are aquatic plants, the methods and systems of the invention require water as a growth medium for the macroalgae. Beneficially, the water growth medium used according to the present invention does not require substantial amounts of freshwater since the macroalgae used according to the invention are those that grow well in harsh, brackish waters. Of course, freshwater could be used as a growth medium and be appropriately adjusted to the correct salinity or dissolved salt content.

Preferably, a saltwater is used as the base material for a growth medium used according to the present invention. The saltwater growth medium can be from any source, such as seawater, saline ground water, or any other water source having a natural average salinity above that acceptable for freshwater (i.e., not requiring substantial desalinization to be considered potable). In certain embodiments, a particularly useful source for a saltwater growth medium is saline ground water from the Permian basin in North America. Such water is naturally lower in sodium chloride content than seawater, which can be beneficial, as discussed below. Moreover, sources of ground water from the Permian basin are located in areas away from the sea coast where land is naturally less valued and typically is not already in use for other economic purposes, such as crop growth, recreation, or urban development. As discussed further below, other geographic regions particularly suitable for supporting the methods and systems of the present invention likewise tend to be in areas not otherwise valued for other economic ventures. Water from the Permian basin also is quite useful because of its naturally high carbonate content, which is valued for inducing exoskeleton growth on the macroalgae used in the invention. Of course, it is understood that discussion of saline ground water from the Permian basin is exemplary in nature of the type of water source that is particularly useful according to the invention and is not intended to limit the scope of practice of the invention.

To the extent possible, it is desirable to carry out the methods of the invention in areas giving rise to water sources that provide a saltwater growth medium substantially close to the desired chemical content, as described below. It clearly is possible according to the invention, however, to start with a water growth medium have a variety of chemical compositions and then adjust the composition to the desired parameters discussed below.

A saltwater growth medium useful according to the present invention may have a basic composition somewhat similar in scope to that of average, natural seawater. Specifically, the saltwater growth medium can have a substantially large content of sodium chloride and much lesser contents of a variety of further salts and minerals. For comparative purposes, Table 1 below provides a description of the various components of seawater that also may be present in the saltwater growth medium of the present invention. The representative seawater composition is typical, 3.5% by weight (35 ppt) total salinity water. Only elements present in appreciable amounts (i.e., at least 1 ppm) are included, although trace amounts of close to 60 further elements can be present in seawater samples.

TABLE 1

Main Elements Present in Typical 35 ppt Seawater

| Element | ppm |
|---|---|
| Hydrogen | 110,000 |
| Oxygen | 883,000 |
| Sodium | 10,800 |
| Chlorine | 19,400 |
| Magnesium | 1,290 |
| Sulfur | 904 |
| Potassium | 392 |
| Calcium | 411 |
| Bromine | 68 |
| Carbon | 28 |
| Nitrogen | 15.5 |
| Fluorine | 13.0 |
| Strontium | 8.1 |
| Silicon | 2.9 |
| Boron | 4.5 |

Although the saltwater growth medium useful according to the present invention exhibits many commonalities of typical seawater compositions, the saltwater growth medium useful according to the present invention provides very specific characteristics that allow for the surprisingly accelerated growth of macroalgae species described herein while preventing growth of most other algae that are capable of sustained growth in typical seawater compositions.

In specific embodiments, the saltwater growth medium of the present invention is characterized by an alkaline pH. Preferably, the saltwater growth medium of the invention has a pH of at least about 7.5. In other embodiments, the saltwater growth medium has a pH of at least about 8.0 or at least about 8.5. In certain embodiments, the saltwater growth medium can have a pH of about 7.5 to about 10.0, about 8.0 to about 10.0, or about 8.0 to about 9.5.

The saltwater growth medium of the invention particularly can be characterized by the calcium content of the water. Preferably, the saltwater growth medium has a calcium content of at least about 250 mg/L. The calcium content can be calculated based upon the various sources of calcium available, such as calcium carbonate, calcium bicarbonate, or other calcium salts that may be naturally present and/or added to the composition. The calcium content can be described as in terms of the free calcium ions ($Ca^{+2}$) in solution in the saltwater growth medium. In other embodiments, the saltwater growth medium can have a calcium content of at least about 300 mg/L, at least about 400 mg/L, at least about 500 mg/L, at least about 600 mg/L, at least about 700 mg/L, at least about 800 mg/L, at least about 900 mg/L, at least about 1.0 g/L, at least about at least about 1.25 g/L, at least about 1.5 g/L, at least about 1.75 g/L, or at least about 2.0 g/L. In further embodiments, the saltwater growth medium can include calcium in an amount of about 500 mg/L to about 12.5 g/L, about 500 mg/L to about 10 g/L, about 500 mg/L to about 9 g/L, about 500 mg/L to about 8 g/L, about 500 mg/L to about 7 g/L, about 500 mg/L to about 6 g/L, about 500 mg/L to about 5 g/L, about 750 mg/L to about 5 g/L, about 1 g/L to about 5 g/L, or about 2 g/L to about 5 g/L.

Like natural seawater, the saltwater growth medium of the present invention can include a substantial content of sodium chloride (i.e., sodium ions and chlorine ions in solution). The saltwater growth medium of the present invention, however, distinctly differs from natural seawater, as well as other water compositions for growing algae as a biomass source, in that the calcium content in relation to the sodium chloride content is significantly higher. For example, in the exemplary formulation provided in Table 1 for typical, 35 ppt seawater, sodium and chlorine combined account for 30,000 ppm of the total salinity while calcium accounts for only around 400 ppm of the total salinity. Thus, the typical, natural ratio of the combined total of sodium and chlorine to the content of calcium is about 75 (i.e., 30,000/400). While seawater compositions can vary in their total salinity, this ratio tends to remain the same or even higher.

On the contrary, the saltwater growth medium of the present invention is characterized by having a surprisingly high calcium content in relation to the content of sodium and chlorine. In certain embodiments, the saltwater growth medium can have a content of calcium and a content of sodium and chlorine such that the weight ratio of the combination of sodium and chlorine to the calcium is greater than about 0 but less than about 50 [i.e., the ratio being calculated as $(Na^+ + Cl^-)/Ca^{+2}$]. In further embodiments, the ratio can be greater than 0 but less than about 45, greater than 0 but less than about 40, greater than 0 but less than about 35, greater than 0 but less than about 30, or greater than 0 but less than about 25. This significantly skewed salt ion ratio in relation to typical seawater compositions is indicative of the harsh, brackish conditions that, while substantially preventing growth of other types of vegetation, causes the macroalgae described herein to flourish and provide a fast growing, sustainable, significant bulk biomass resource.

In addition to the high calcium content, the saltwater growth medium of the present invention also can include further materials in amounts that are not typically found in water used for purposeful algae growth. For example, in specific embodiments, it is beneficial according to the invention to provide the saltwater growth medium with a sulfate content of at least about 1 g/L. In further embodiments, the sulfate content can be at least about 1.5 g/L, at least about 2 g/L, at least about 2.5 g/L, or at least about 3 g/L. In other embodiments, the sulfate content can be about 1 g/L to about 16 g/L, about 2 g/L to about 12 g/L, about 2 g/L to about 10 g/L, about 2 g/L to about 8 g/L, about 2 g/L to about 6 g/L, or about 3 g/L to about 5 g/L.

The addition of specific amounts of sulfates can be via any chemical compounds that will provide free sulfate anions in solution, such as sulfate salts (e.g., calcium sulfate) or even dilute acids (e.g., sulfuric acid) so long as any acid addition does not adversely affect the desired saltwater growth medium alkalinity and overall pH. The addition of sulfates to the growth medium particularly is useful to provide the rapidly growing macroalgae with sufficient available sulfur for use in making key plant components, such as amino acids needed for plant protein production. Moreover, as noted above, the types of macroalgae useful according to the invention can have the characteristic of a strong odor. While not wishing to be bound by theory, it is believed that the addition of sulfates to the growth medium can be beneficial for facilitating production of the odor-forming compounds, which may be similar in nature to compounds causing garlic-like odors. The presence of the odor causing compounds can be a further defense mechanism (in addition to the inorganic plant exoskeleton formed on the surface of the organic plant parts of the macroalgae described herein) that assists the macroalgae in having almost competition free growth when cultivated according to the methods and systems described herein. Specifically, the odor can be useful to inhibit consumption of the macroalgae by herbivores or even microscopic organisms that may otherwise attack, injure, and possible kill algae growing in an open pond system. The effects of odor causing chemicals in plants as a defense mechanism is discussed by Lindsey J. Macpherson, Bernhard H. Geierstanger, Veena Viswanath, Michael Bandell, Samer R. Eid, SunWook Hwang, and Ardem Patapoutian (2005). "The pungency of garlic: Activation of TRPA1 and TRPV1 in response to allicin". *Current Biology* 15 (May 24): 929-34, which is incorporated herein by reference.

It also can be beneficial to control the nitrogen content of the saltwater growth medium used in the present invention. In specific embodiments, the nitrogen content can be at least about 6 mg/L, at least about 7.5 mg/L, at least about 10 mg/L, at least about 12.5 mg/L, at least about 15 mg/L, at least about 17.5 mg/L, or at least about 20 mg/L. in further embodiments, the nitrogen content can be about 10 mg/L to about 100 mg/L, about 10 mg/L to about 90 mg/L, about 10 mg/L to about 80 mg/L, about 10 mg/L to about 70 mg/L, about 10 mg/L to about 60 mg/L, about 10 mg/L to about 50 mg/L, about 15 mg/L to about 40 mg/L, or about 15 mg/L to about 35 mg/L.

As noted previously, the macroalgae useful according to the present invention surprisingly have been found to flourish in unusually harsh conditions. This extends specifically to the presence of materials that have been heretofore thought to be completely detrimental to stoneworts particularly. According to Forsberg (1964, "Phosphorus, A Maximum Factor in the Growth of Characeae," *Nature*, 201(4918): 517-518), the species Chara globularis only grew well in a water composition with no phosphorus or only low phosphorus. The extent of his testing led the author to teach that the upper limit for phosphorus concentration for *Chara* growth is 20 µg/L.

In certain embodiments, the saltwater growth medium of the present invention can include phosphorus in an amount of at least about 0.5 mg/L, or 25 times greater than the maximum amount of phosphorus taught in the literature as being possibly present in a *Chara* growth medium. In further embodiments, the saltwater growth medium can include phosphorus in an amount of at least about 1 mg/L, at least about 1.25 mg/L, at least about 1.5 mg/L, at least about 1.75 mg/L, or at least about 2 mg/L. In additional embodiments, the saltwater growth medium can comprise phosphorus in an amount of about 0.5 mg/L to about 8 mg/L, about 0.5 mg/L to about 7 mg/L, about 0.5 mg/L to about 6 mg/L, about 0.5 mg/L to about 5 mg/L, about 0.5 mg/L to about 4 mg/L, or about 1 mg/L to about 3 mg/L.

In addition to the specific materials described above, it can be useful according to the invention for the saltwater growth medium to include additional materials, typically in only relatively small amounts in comparison to the materials described above. Such further materials and preferred ranges for the materials are provided in Table 2 below. Such materials can be highly useful by the macroalgae and other beneficial organisms in the saltwater growth medium in the production of various molecules needed for desirable growth and survival. Preferably, the materials can be provided in concentration ranges, such as shown in Table 2, that are greater than would be expected to be found in average, natural bodies of water (e.g., seawater)

TABLE 2

Further Materials Desirably Included in the Saltwater Growth Medium

| Material | Units | Approximate Ranges |
| --- | --- | --- |
| Silicon | mg/L | 1.5-24 (e.g., 3-12 or 4-8) |
| Iron | mg/L | 0.5-8 (e.g., 1-4 or 1-3) |
| Manganese | mg/L | 0.025-0.4 (e.g., 0.05-0.2) |
| Cobalt | mg/L | 0.025-0.4 (e.g., 0.05-0.2) |
| Zinc | mg/L | 0.0025-0.04 (e.g., 0.005-0.02) |
| Molybdenum | mg/L | 0.00125-0.02 (e.g., 0.0025-0.01) |
| Copper | mg/L | 0.00125-0.02 (e.g., 0.0025-0.01) |

As noted above, the saltwater growth medium preferably is sourced in a manner that the beginning composition is as close as possible to the final, desired characteristics described above for producing the macroalgae according to the present invention. Given the unique composition and characteristics, however, it is expected that at least some degree of supplementation to the water source will be required to achieve the final, desired composition. Accordingly, the present invention also provides specific methods for treating the saltwater growth medium to initially achieve the desired composition and to maintain the desired composition throughout the cultivation of the macroalgae. Preferably, the saltwater growth medium is obtained and/or prepared such that a desired total salinity is achieved. In specific embodiments, the total salinity of the saltwater growth medium is at least about 0.5% by weight or 5 ppm, preferably at least about 1% by weight or 10 ppm. In other embodiments, the total salinity can be about 1% by weight (10 ppm) to about 15% by weight (150 ppm), about 1.5% by weight (15 ppm) to about 15% by weight (150 ppm), about 1.5% by weight (15 ppm) to about 10% by weight (100 ppm), about 1.5% by weight (15 ppm) to about 7.5% by weight (75 ppm), or about 1.5% by weight (15 ppm) to about 5% by weight (50 ppm). In some embodiments, it can be desirable for the saltwater content to be greater than 0 but less than about 10% (100 ppt), less than about 9% (about 95 ppt), less than about 8% (about 80 ppt), less than about 7% (about 70 ppt), less than about 6% (about 60 ppt), less than about 5% (about 50 ppt), less than about 4% (about 40 ppt), or less than about 3% (about 30 ppt).

Total salinity may be an important characteristic according to the invention because of the overall advantage provided to the macroalgae useful according to the invention. While not wishing to be bound by theory, it is believed that at zero to low salt levels, competition among many plant types may dominate. As salt levels increase, however, fewer plants can survive and flourish in the manner seen by the macroalgae according to the invention. At continually higher salt concentrations, although the macroalgae continue to grow, productivity may be reduced as the plants work harder to maintain necessary salt ratios across the cell membranes. This characteristic may depend in part upon other factors, such as the specific type of macroalgae, ambient temperature and humidity, other water nutrients, and the like.

As macroalgae grow they deplete the growth medium of many necessary growth components, such as carbon dioxide and nitrogen. Since the macroalgae used according to the present invention can be exoskeleton growing species, they also rapidly uptake ion components necessary to form the calcium carbonate exoskeleton. Accordingly, various methods may be employed according to the present invention to achieve and maintain the desired saltwater growth medium characteristics to provide useful, sustainable, economical macroalgae growth as a biomass source.

In relation to supplementation of carbon dioxide, known art methods typically rely upon bubbling techniques. This is ineffective, however, since carbon dioxide has water solubility of only about 4.4 mg/L. Bubbling quickly saturates the water, and further additions beyond saturation simply escape to the atmosphere and cannot be used by the algae. Moreover, known gas distribution systems to facilitate bubbling of carbon dioxide in open ponds covering many acres are prohibitively expensive.

The present invention overcomes such problems using processes that rely upon combinations of chemical reactions to provide a highly usable carbon source for growing algae that meets the needs of the organic plant components (i.e., the actual plant portion of the macroalgae) and the inorganic plant components (i.e., the exoskeleton portion of the macroalgae). In certain embodiments, it can be useful according to the invention to add one or more strong bases to the saltwater growth medium as a means to increase overall pH of the growth medium. In preferred embodiments, a hydroxide compound may be used, such as an alkali metal hydroxide (e.g., sodium hydroxide) or alkaline earth metal hydroxides (e.g., calcium hydroxide). Preferably the hydroxide compounds are provided in a content sufficient to maintain the overall pH of the saltwater growth medium in a range as otherwise described herein. Hydroxide additions can be beneficial by contributing to the alkalinity of a system by neutralizing acids that would otherwise exhaust buffers from the system. Simply stated, hydroxide molecules are spent rather than carbonate molecules, and high calcium and adequate alkalinity thus can be maintained (e.g., by addition of recycled calcium carbonate exoskeleton from the macroalgae).

In further embodiments, it can be beneficial according to the invention to provide one or more ion precursors useful for providing ions in solution usable by the macroalgae to form the protective exoskeleton. Preferably, one or more materials capable of forming calcium ions and carbonate ions in solution may be used. Of course, calcium carbonate materials themselves may be used. Preferentially, the saltwater growth medium is contained in a pond of similar structure having a natural structure that is enriched in minerals suitable for adding to the calcium carbonate content of the saltwater growth medium contained therein.

In specific embodiments, the material capable of forming calcium ions and carbonate ions in solution may be the actual calcium carbonate-containing exoskeletons that can be separated from the macroalgae grown according to the invention. Such recycling of the exoskeleton is described in greater detail below.

The combination in solution of the natural ingredients of the saltwater growth medium and one or more materials that may be added thereto according to the invention can function in unison to provide a growth medium composition that is ideally suited for growing the macroalgae described herein in a surprisingly rapid and efficient manner. Although not wishing to be bound by theory, it is believed that the specific combinations of materials added to the saltwater growth medium function to produce exceedingly high concentrations of calcium bicarbonate in the saltwater growth medium. This is particularly beneficial since it has been found according to the invention that the macroalgae described herein can utilize the calcium bicarbonate in the saltwater growth medium in like fashion to free carbon dioxide. Specifically, the calcium bicarbonate can function as a precursor to provide carbon, oxygen, and calcium needed to form the organic matter in the plant itself (e.g., proteins, carbohydrates, and oils), as well as the protective exoskeleton. As illustrated in the Examples appended hereto, it has been found according to the invention that by providing high contents of calcium bicarbonate in the saltwater growth medium, the growth rate of macroalgae, such as those in the *Chara* genus, surprisingly can be accelerated as much as ten-fold and beyond compared to systems that do not include the increased calcium bicarbonate content. As such, the saltwater growth medium may be characterized in relation to the measurable calcium bicarbonate content thereof. In specific embodiments, it can be useful to provide a saltwater growth medium with a concentration of calcium bicarbonate that is in the range of about 1 g/L to about 50 g/L. In further embodiments, the saltwater growth medium may have a concentration of calcium bicarbonate that is in the range of about 2 g/L to about 45 g/L, about 2 g/L to about 40 g/L, about 2 g/L to about 35 g/L, about 2 g/L to about 30 g/L, about 2 g/L to about 25 g/L, about 2 g/L to about 20 g/L, about 2 g/L to about 15 g/L, about 2 g/L to about 10 g/L, about 2 g/L to about 9 g/L, about 2 g/L to about 8 g/L, about 3 g/L to about 7 g/L, or about 4 g/L to about 6 g/L.

In typical settings, a rapid algae growth (or "bloom) can rapidly and drastically deplete a water system (particularly a closed system) of essential nutrients for the algae growth, which ultimately reduces the growth pattern or even ultimately destroys the algae. According to the present invention, monitoring and addition of necessary chemicals can result the desired concentration of calcium bicarbonate in the saltwater growth medium of the invention, preferably a concentration that remains substantially within defined concentration limits. Thus, chemicals are added such that the calcium bicarbonate concentration preferably does not fall below the minimum desired level, but only enough is added so that the calcium bicarbonate concentration preferably does not rise above the maximum desired level, which could undesirably alter the water chemistry and/or simply be economically wasteful. In other words, it is desirable to avoid sharp spikes and drastic drops in calcium bicarbonate concentrations (although slight variations above and below the defined limits may be allowable for short terms).

The calcium bicarbonate concentration may be achieved by simple timed sampling of the growth medium and employment of standard assays to evaluate the calcium bicarbonate concentration of the samples (or concentrations of other components of the saltwater growth medium). In preferred embodiments, continuous monitoring can be employed and can be partially or totally automated. For example, permanent, in-place ion selective electrode monitors may be placed in one or more locations throughout the containment system for the saltwater growth medium. This can provide for continuous monitoring of the calcium bicarbonate level (as well as levels of other desirable constituents of the growth medium, as described herein), and can automatically prompt addition of the necessary materials to maintain the concentration that is desired or can provide an alert for manual addition of the necessary materials. Similar monitoring may be used to ensure salt levels in the growth medium do not exceed the desired concentrations such that the desired ratio of sodium chloride to calcium is not exceeded. For example, if salt content increased beyond a desired range (e.g., by evaporation), additional water could be added to the system to modify the salt concentration accordingly.

Although not wishing to be bound by theory, the above management techniques for maintaining preferred saltwater growth medium makeup can arise from recognition of a complex interplay of chemical reactions that can be managed by appropriate additions of the necessary chemicals. For example, carbon dioxide can react in water to form a dilute solution of carbonic acid ($H_2CO_3$). Although a relatively weak acid, the carbonic acid can react with calcium carbonate in a water system to form calcium bicarbonate. The addition of calcium hydroxide to the system can again facilitate the formation of solid calcium carbonate. These reactions are shown below in formulas 1-3.

$$CO_2 + H_2O \rightarrow H_2CO_3 \qquad (1)$$

$$H_2CO_3 + CaCO_3 \rightarrow Ca(HCO_3)_2 \qquad (2)$$

$$Ca(HCO_3)_2 + Ca(OH)_2 \rightarrow 2CaCO_3 + 2H_2O \qquad (3)$$

The foregoing also can be balanced with the natural conversion of calcium bicarbonate in solution in the presence of water-loss forces (e.g., evaporation in an open pond system and plant uptake in photosynthesis) and a nucleation substrate (e.g., the external surfaces of exoskeleton-forming macroalgae). This conversion can be according to formula 4 provided below.

$$Ca(HCO_3)_2 \rightarrow CO_2(g) + H_2O(l) + CaCO_3(s) \qquad (4)$$

In the systems and methods of the present invention, it is believed the chemical conversion described in formula 4 can be highly important in the excellent results achieved in the present invention and can be strongly related to growth medium calcium content, calcium bicarbonate content, and pH, as well as further factors described herein. Specifically, the high, concentration of calcium bicarbonate functions as a de facto source of carbon dioxide, which is absolutely required for optimum plant growth. Moreover, the economic benefit arising from this method in comparison to a bubbling method, as well as the increased ability for providing a carbon dioxide source, illustrates one of the many benefits of the present invention over the known art. Further, the high, concentration of calcium bicarbonate can lead directly to nucleation on the thallus (as well as other parts) of the macroalgae to provide the protective exoskeleton. The calcium carbonate deposition is further magnified by the direct addition of calcium carbonate to the saltwater growth medium and the interplay with the further chemical additives as described above. Simply stated, by combining a high pH with a high additive amount of calcium carbonate, water conditions (e.g., excess calcium bicarbonate concentrations) can be formed such that the water rapidly absorbs and holds carbon dioxide for a time sufficient for the macroalgae to utilize the carbon dioxide in photosynthesis and such that sufficient calcium is present for the macroalgae to form its desirable protective exoskeleton.

The invention also is beneficial because of the monitoring of the saltwater growth medium content concentrations. Continuous or periodic monitoring may be used to ensure the concentrations of the various components are within desired ranges. In periodic monitoring, simple assays may be used to evaluate concentrations of specific materials, particularly calcium bicarbonate or its individual ions. In continuous monitoring, sensors may be used to provide on-going (e.g., real time) concentrations of one or more components of the saltwater growth medium. Thus, it can be possible to carry out the methods of the invention such that one more components is maintained in the growth medium at a continuous concentration. In such embodiments, a continuous concentration growth medium (i.e., in relation to a specific component thereof) can described a growth medium composition that undergoes observation and adjustment on a routine schedule, preferably under constant monitoring, such that the concentration of the specific component always remains within defined parameters. Of course, the invention is not necessarily limited to such embodiments but could encompass growth mediums with varying levels of one or more components that can be periodically adjusted to keep the concentration substantially within the desired ranges.

Thus, it clearly can be seen that the present invention has identified specific water formulations and methods of achieving such formulations that, while based on basic chemical reactions, provide a unique sequence of events that ultimately achieves sustainable, economically viable biomass production when coupled with the use of specific macroalgae that exhibit the unique characteristics needed to take advantage of the unique conditions established according to the invention.

III. Growth Medium Containment

The methods and systems of the present invention can be characterized (and may be distinguished from known algae growth systems) by the container used for the saltwater growth medium. Such saltwater growth medium container can have any of the features as described herein, specifically in the sense that it can be any natural or artificial formation that contains water—i.e., holds the water within its bounds for a prolonged period of time. In specific embodiments, the containment means used for the growth medium can simply be described as a pond. Preferably, any water containment means that is open to the atmosphere and generally meets the requirements as described herein could be used according to the invention. As previously pointed out, microalgae can be grown using a closed system photobioreactor but, although this provides control over growth conditions, operation and production costs of photobioreactors are much higher due to the requirement for more complicated technology.

Thus, in certain embodiments, the methods and systems of the present invention can be characterized by the use of a saltwater growth medium containment system that is open to the atmosphere or, in other words, is not a closed system. Such containment means can be referred to as an open pond system. As will be better understood in light of the following discussion, the phrase "open pond system" is not intended to be limiting and can encompass a variety of types and shapes of containers, natural or man-made. The advantages of using an open system in the present invention are numerous. First, start-up costs are greatly reduced because there is no need for costly bioreactors. Moreover, natural reservoirs can be used, and may even be preferred, because of the natural chemical makeup of the water contained therein and the need for reduced chemical additions to achieve the desired saltwater growth medium.

As the name indicates, an open pond system according to the invention is open to the atmosphere to the extent that the water growth medium is not in a closed system. Rather, ambient air and/or sunlight may be freely available, and the open pond system may allow for unfettered interaction with the surrounding environment. Accordingly, bacteria and other organisms that may be detrimental to algae growth processes otherwise known in the art may have free access to the macroalgae being grown according to the present invention; however, because of the nature of the macroalgae used in various embodiments described herein (i.e., the formation of the calcium carbonate-containing exoskeleton that is formed by the macroalgae in response to the specific water conditions provided in the pond), such organisms may not necessarily be detrimental to the macroalgae growth.

Of course, the word "open" should not be viewed as unnecessarily limiting. For example, the ponds used according to the invention are not required to be limited to outdoor location. Although the freedom to use outdoor settings is highly desirable for many reasons, the present invention could be practiced in ponds or tanks that are partially or completely sheltered, including being completely interior to a building or other similar construct.

Likewise, the nature of the "pond" used in the invention should not be unnecessarily limited. In origin, the word pond is a variant of the word pound, which means a confining enclosure. In this sense, a pond useful according to the present invention can be any confining enclosure that otherwise is in line with the further disclosure provided herein. Ponds useful according to the invention can result from a wide range of natural or artificial processes. Any depression in the ground which collects and retains a sufficient amount of precipitation can be considered a pond, and such depressions can be formed by a variety of geological and ecological events, as well as human activity. The classification of a body of water as pond (such as versus a lake) can based on the dimensions of the body. A pond, as used in relation to the present invention, should not limited by technical definitions that may vary by locality, governing body, or other non-standardized understandings. Rather, a pond as used herein can be any body of water that can allow for sustained growth of macroalgae as described herein.

In specific embodiments, certain dimensional characteristics may be preferred for reasons of economy or convenience, or such characteristics may be useful for providing the maximum achievable (preferably sustainable) growth patterns for the macroalgae. In some embodiments, a pond used according to the invention may be any body that contains water for suitable time over an area covering up to about 100 acres, up to about 75 acres, or up to about 50 acres. Although larger coverage areas could be used, these sizes are provided simply because it is believed that this provides a reasonable limit for ease of harvesting of the macroalgae and controlling the water chemistry throughout the entire body of water. Larger areas could be used with appropriate harvesting methods and chemical content control. In other embodiments, a pond used according to the invention may be any body that contains water for suitable time over an area covering at least about 1 acre, at least about 2 acres, at least about 3 acres, or at least about 4 acres. Although smaller coverage areas could be used, these sizes are provided simply because it is believed that smaller sizes may reduce the economy of the methods such that the mass of macroalgae that could be harvested in the smaller area may be insufficient to counterbalance the operating costs of the venture. In specific embodiments, the size of a pond useful according to the invention may be in the range of about 2 acres to about 100 acres, about 4 acres to about 100 acres, about 5 acres to about 90 acres, about 6 acres to about 80 acres, or about 10 acres to about 70 acres.

Pond depth may also be a contributing factor. By some definitions, a pond is a body of water where even its deepest areas are reached by sunlight. Since sunlight penetration can be controlled by a variety of factors, such definition should not viewed as controlling the nature of the pond useful according to the present invention. Since the macroalgae useful according to the invention may be rooting species, it is beneficial for the pond depth to be such that the macroalgae are a provided a suitable water depth for maximizing growth potential without severely limiting sunlight penetration close to the root zone. Since the floor of a pond is not necessarily flat and level across the entire surface are of the pond, depths are provided herein as an average depth. In some embodiments, pond depth preferably is at least about 1 foot, at least about 1.5 feet, or at least about 2 feet. In other embodiments, pond depth can be up to about 10 feet, up to about 8 feet, or up to about 6 feet. In specific embodiments, pond depth may be in the range of about 2 feet to about 8 feet, 2 feet to about 7 feet, 2 feet to about 6 feet, or about 3 feet to about 5 feet.

Preferably, ponds useful according to the invention will contain the water therein for a suitable amount of time. Most natural bodies that hold water have some degree of porosity and/or run-off. This means that even without an evaporative effect, water held therein will not remain indefinitely without some source of replenishment. Some thus have defined a pond as a body that will contain water for at least about four months out of the year. Preferably, a pond used according to the invention holds water for a suitable amount of time for macroalgae to become established and grow therein. Otherwise, holding potential is mainly an economical consideration in relation the cost of water for replenishing the pond or suitable treatment to maintain desired chemical composition to account for water loss. In this regard, it should be noted that a pond as used herein preferably has a relatively low water current. Thus, although it is acceptable for ponds used herein to be spring-fed or stream-fed, it is preferably that the in-flow and out-flow of the water in the pond is sufficiently controlled such that the chemical composition of the pond can be more easily controlled and maintained.

One specific aspect in which the ponds used according to the present invention may be characterized is the presence of soil. Of course, in the production of microalgae, soil content, or even the presence of soil at all, typically is not considered critical. Since the macroalgae used in the present invention may be rooting species, soil presence can be absolutely required, and the chemical nature of the soil may be of particular importance. While the word "soil" is used herein, its use should not be considered limiting. Rather, the word in meant to encompass more technical terms, such as silt, and is intended to mean any land composition and nature enabling rooting of macroalgae and facilitating plant growth.

Further, although the presence of soil can be a necessary component in some embodiments, the ponds useful according to the invention are not necessarily limited to bodies formed in actual land. Rather, artificial containers could be used so long as soil is provided in some fashion to provide a rooting zone for the macroalgae, as needed. Thus, the invention also could encompass any type of construct, including natural land formations, artificial land formations (e.g., excavations), and engineered containers. Moreover, ponds in land formations could have completely soil-based bottoms, or they could include some type of lining (including flexible or aggregate linings) that is at least partially covered with a content of soil (preferably of a nature to provide adequate plant nutrition and anchoring capability).

In some embodiments, it can be particularly useful for the soil in the pond to have a specific pH, preferably a pH indicating the soil is alkaline in nature. In certain embodiments, soil pH in the pond can be at least about 7.5, at least about 8, or at least about 8.5. In other embodiments, soil pH may be in the range of about 7.5 to about 11, about 8 to about 10.5, about 8 to about 10, or about 8.5 to about 10. Such pH may be determined by standard assays and meters that are commercially available. This alkaline pH is of particular interest because most plant life does not grow well (or at all) in such alkaline soil conditions. Surprisingly, however, it has been found that such typically inhospitable soil conditions can be particularly effective for the growth of macroalgae.

The soil in the ponds used according to the invention also can be characterized by the presence of certain chemical components. For example, specific geographic locations (such as western Texas in the U.S.) have soil that is naturally alkaline and has a high content of minerals (e.g., gypsum and limestone) that can leach into water sources and standing bodies of water and thus provide natural sources of chemicals and minerals useful in the growth medium described herein (e.g., act as sources for calcium ions in solution, as well as carbonate and bicarbonate ions in solution). Again, such soil composition often is unfavorable for much vegetation growth but has been found to be favorable for macroalgae growth according to the present invention. Because open pond systems with a soil content are favored according to the invention, the ability of the macroalgae to grow surprisingly well in extreme conditions actually can make certain geographic locations particularly desirable. Moreover, the chemical nature of the soil surrounding the pond (not just lining the floor of the pond) can affect the nature of the water in the pond. For example, during rainy times, water run-off from the surrounding terrain can make its way into the pond, and locating the pond in areas with surrounding soil conditions that provide desired mineral content can provide valuable assistance in regulating the chemistry of the saltwater growth medium contained in the pond. Still further, groundwater naturally found in locations with alkaline, high mineral content soil can likewise be alkaline in nature with a high mineral content. For example, groundwater sources of the Permian basin in the west Texas region can have a natural salinity that is very useful for the saltwater growth medium useful in the invention. Thus, with knowledge of the various specific requirements for growing macroalgae according to the present invention, it is possible to locate specific geographic regions that can provide ideal growing conditions in relation to soil content, water composition, and other useful factors.

For example, research according to the present invention has determined that preferred geographic locations for carrying out the methods of the invention may include those with the following characteristics: relatively low utilization factor (or alternatively relatively low cost), relatively high average temperature, relatively high solar insolation (specifically average intensity over the course of a full year), low relative humidity, and relatively high soil alkalinity.

IV. Open Pond System Components

The containment means for the saltwater growth medium can be described in terms of an open pond system. Of course, such system could be formed simply of the pond itself with the various characteristics described above. In some embodiments, the system can comprise further components that are useful in carrying out the invention as described herein.

For example, in specific embodiments, the open pond system can include one or more light sensors. In other words, a saltwater growth medium container used in the invention (e.g., as part of the open pond system) can include a series of light sensors that can be appropriately interspaced to evaluate the light intensity throughout the area and the depth of the pond.

Sunlight only penetrates water to a certain depth (which typically is easily within the depths of ponds used in the present invention). Other factors can affect sunlight penetration, however, including water turbidity and, more importantly, the amount of vegetation growing in the water. In the methods and systems of the present invention, the macroalgae can grow at dramatic rates and can quickly form a thick carpet in the pond that can greatly affect light penetration, or light intensity (which can be evaluated as the intensity of the incident light at the surface of the pond versus the intensity of the light at a specific water depth). In the case of ponds of the depths used according to the present invention, the shading factor can be evaluated as the intensity of the incident light at the surface of the pond versus the intensity of the light at or near the pond floor (or other root zone for the macroalgae). For example, when the amount of light reaching the pond floor is measured to be only 25% of the amount of light available at the water surface, the shading factor is said to 75% (i.e., 75% of the available is being blocked by plant mass—or other material—in the water). Likewise, when the amount of light reaching the pond floor is measured to be 75% of the amount of light available at the water surface, the shading factor is said to 25%.

The presence of light sensors in the pond can be particularly useful for providing prolonged maximization of biomass production. While a thick macroalgae carpet can be indicative of excellent growth conditions, the nature of the carpet mass can eventually cause a decline in mass production because of the reduced amount of sunlight available to plant material at deeper regions of the pond. It has been found according to the present invention that sustained maximum biomass production using macroalgae as disclosed herein can be obtained by maintaining a harvesting schedule that is in part related to the shading factor. Particularly, when the shading factor is allowed to reach too high, biomass production can decline. When harvesting takes place, however, when the shading factor is too low, the ability of the macroalgae to produce harvestable biomass is not being fully realized, and the costs associated with harvesting are not being efficiently managed. In certain embodiments, it is preferable for harvesting to occur when the average shading factor in the harvest zone is in the range of about 20% to about 80%, more preferably in the range of about 25% to about 75%, about 30% to about 70%, about 35% to about 65%, or about 40% to about 60%.

Any suitable light sensing technology could be used in the open pond system of the present invention. In specific embodiments, the light sensors may be spaced throughout the pond to allow for establishment of average shading factor over the entire pond or localization of average shading factor in defined regions (such as in a larger pond system). For example, light sensors could be paired for placement at the surface and at or near the pond floor and could be interspaced such that there is at least one set per 0.25 acres, at least one set per 0.5 acres, at least one set per 0.75 acres, one set per 1 acre, at least one set per 1.5 acres, at least one set per 2 acres, at least one set per 2.5 acres, at least one set per 5 acres, at least one set per 10 acres, or at least one set per 15 acres. Preferably, the light sensors may be coupled to a computer system that allows for constant monitoring and provision of appropriate alert when the shading factor in certain regions or in the pond generally reach levels indicating harvest is required.

Because macroalgae growth can vary in open pond systems based upon uncontrollable factors, such as temperature, sunlight, and other weather conditions, the use of shading factor as a measure of harvest time can be highly valuable in maintaining sustained, maximum biomass production. Preferably, other technologies for achieving this end also may be employed. For example, in some embodiments, the open pond system may comprise optical sensors that can be used to evaluate macroalgae maturity. Such sensors could encompass underwater cameras, as well as sensors that can detect changes in plant size, shape, position, or any other characteristic that would indicate growth to a stage suitable for harvest.

Like many plants, macroalgae can have a defined growth curve wherein less mature macroalgae have a faster growth rate, and the growth rate may slow upon reaching a certain level of maturity, which can be determined by visual examination. Harvesting less mature plants can decrease overall production because plants are being taken during their stage of more rapid growth. If harvesting is delayed long after maturity is reached, overall production again declines because the mature plants contribute to shading while having less or no contribution to further biomass production. Thus, optical sensors may be used in the invention to allow for more precise control over harvesting intervals. Such sensors could be permanently placed within the pond or could be provided with means allowing for movement throughout the pond on regular intervals to evaluate the entire crop. Likewise, the optical sensors could be used manually, such as on human or computer-controlled vessels that can move about the pond under specific control to evaluate crop maturity.

The open pond system of the invention also may include one or more devices for harvesting the macroalgae, grinding the macroalgae to compromise the exoskeleton thereon, and separating the exoskeleton from the organic macroalgae parts. Even further post-harvest processing devices, such as drying devices for reducing water content of the organic plant portions of the macroalgae could be included. As discussed above, harvesting of the macroalgae preferably is carried out at defined intervals so as to maximize the biomass obtained with each harvest. In certain embodiments, harvesting can comprise removing only a portion of the individual macroalgae plants. Since the macroalgae used according to the invention can be rooting species, it typically is desirable for the harvesting method to be such that a significant portion of the plant, including the roots, be left intact and still growing in the pond. Of course, it is recognized that the ability to achieve this end can depend upon the integrity of the individual plants and various other conditions. Thus, it is understood that any description herein of removing only a portion of the individual macroalgae plants encompasses a fraction of the plants being totally uprooted. The intent, however, is that uprooting is minimized to the extent possible so that individual plants can continue to grow and be harvested time and time again.

Any apparatus useful for cutting water plants while actively growing in water can be used according to the present invention. A self-contained apparatus that functions as both means for traversing a pond and as means for cutting the macroalgae could be used as the device for harvesting the macroalgae. In other embodiments, the cutting apparatus could be an add-on device that can be attached to any suitable boat or similar vessel. In some embodiments, the harvester may be an apparatus that merely cuts the macroalgae and leaves it in the saltwater growth medium. In such embodiments, the pond system may further comprise a separate apparatus for gathering the cut macroalgae. Such gathering apparatus may be combined with the cutting apparatus to provide a single harvesting device that cuts the macroalgae and immediately gathers the cut plants for removal from the saltwater growth medium. Specific examples of harvesting devices that could be used according to the invention are those in the line of products marketed under the brand Jenson Lake Mower™ (available from Jenson Technologies, San Marcos, Tex.), which are battery powered, electric cutting blades that can be removably attached to a floating vessel (see, http://www.lakemower.com/index.html).

The open pond system may include further standard industrial and/or farming devices, such as conveyor belts, tractors, dump trucks, bucket loaders, fork lifts, roller presses, and the like for assisting in the growth and harvest of the macroalgae, and a skilled person relying upon the present disclosure would be able to envision further such devices that could be useful. Such further devices are intended to be encompassed by the present invention.

V. Methods of Producing Macroalgae

In one aspect, the present invention can be directed to methods of producing macroalgae. The inventive methods arise from detailed research that has identified specific combinations that allow for surprising results that could not have been otherwise foreseen from the known art. For example, the methods allow for production of macroalgae in growth environments that typically do not support other types of algae and/or many other types of plants generally. Moreover, the methods allow for production of macroalgae of the types described herein in amounts that greatly exceed amounts achievable using known technology.

In certain embodiments, the invention can be directed to a method of producing macroalgae comprising growing the macroalgae in an open pond system comprising a saltwater growth medium have specific characteristics as described herein. As used herein, the term "producing" is intended to be used in its broadest sense and can include all phases of growth, including inoculation of the desired macroalgae species, obtaining prepared inoculums, placement of inoculums in the saltwater growth medium, and applying the methods and systems described herein to facilitate growth of the macroalgae. Producing also can encompass actions beyond growth, including harvesting of the macroalgae, post-harvest processing of the macroalgae, and directing the harvested macroalgae products to one or more end-uses.

The inventive methods of production also may encompass actions preliminary to the macroalgae growth. For example, the production methods may comprise preparation of a saltwater growth medium and/or preparation of a saltwater growth medium containment system. For example, this could encompass identifying a site with desired characteristics for location of the containment system and/or providing necessary structures and/or equipment at the location as necessary for use in the production methods and systems. Production also could encompass actually forming a pond or modifying an existing pond to be better suited for use according to the invention. Production also may encompass identifying a water source for use in making the saltwater growth medium and/or providing means for delivery of the water source to the containment system (or pond).

The inventive methods may comprise providing and/or using a growth medium having the specific characteristics otherwise described herein. In specific embodiments, a pond for use in the methods can be filled with water (if necessary) and then brought to the desired chemical composition as described herein. This may comprise addition of one or more chemical additives (e.g., any material useful for providing key composition elements, such as carbon, nitrogen, oxygen, calcium, sulfur, and potassium, which may be in the form of specific compounds—e.g., calcium carbonate or calcium bicarbonate—or may be in the form of more complex materials—e.g., a commercial fertilizer that provides nitrogen and other materials).

While freshwater ponds may be used according to the invention, it is necessary to adjust the water composition to have a desired salinity. Accordingly, it can be beneficial to begin with ponds containing water that already is saltwater by nature. Otherwise, an unfilled or partially unfilled pond may be used and can be filled using saline ground water and/or seawater. In specific embodiments, saline ground water having a salt content that is lower than that of seawater may be useful, such as water from the Permian basin, which has a salinity that is naturally lower than that of seawater. Such water also is useful because of its naturally high carbonate content, although this parameter may be adjusted as necessary as otherwise described herein. The use of freshwater is not needed according to the invention, and this can add to the economically desirable nature of the invention. If the carbonate content is low, a solution of calcium carbonate may be added, such as by the combination of hydrochloric acid and limestone.

In further embodiments, the methods of the invention may be described in relation to the various steps of the production method itself, which may be inclusive or exclusive of the specific saltwater growth medium composition. For example, in some embodiments, the invention may be directed to a method of producing macroalgae comprising the following steps: growing a soil-rooting, exoskeleton-forming macroalgae in an open pond system such that the macroalgae comprise a plant portion and a calcium carbonate-containing exoskeleton portion; harvesting the macroalgae; and separating the exoskeleton portion from the plant portion of the macroalgae.

The growing step in such methods can include any of the specific requirements otherwise described herein, such as the use of specific growth medium compositions and open pond systems. In some embodiments, inoculums of the desired macroalgae can be prepared or otherwise obtained from methods known in the art and can be added to the pond at some time after the saltwater growth medium in the pond has achieved the desired chemical composition. In preferred embodiments, inoculums are added when the ambient temperature is within a desired range, such as greater than about 2° C., greater than about 5° C., greater than about 10° C., or greater than about 15° C.

As previously described, the macroalgae can be allowed grow until specific conditions are met, such as a specific shading factor in the growth medium or a specific degree of plant maturity has been achieved (e.g., as could be determine through manual, personal inspection or through the use of optical sensing devices). In some embodiments, the macroalgae can be allowed to grow until the light intensity (shading factor) at the bottom of the pond is reduced by algae shading to about 50% of the light intensity at the top of the pond. In preferred embodiments, growth is allowed to continue until the shading factor is in the range of being not less than about 25% but not more than about 75%. Thereafter, the macroalgae may be harvested by standard techniques at a frequency so as to maintain maximum macroalgae production rates. In some embodiments, this can be achieved by harvesting at regular intervals, such as when the shading factor is in the range of about 50%. In some embodiments, harvesting may occur at a frequency of about every two weeks. In preferred embodiments, regular harvesting occurs at a frequency of not less than monthly and not more than weekly.

The harvesting step can include any of the devices or apparatuses (and methods of use thereof) otherwise described herein. Preferably, the percentage of the macroalgae that is removed during harvesting (i.e., the plant mass that is removed from individual macroalgae plants) can be adjusted so as to maintain maximum macroalgae production rates for the location and time of year. In some embodiments, maximum macroalgae production can be achieved by maintaining the preferred shading factors.

The harvesting of the macroalgae can comprise removing only a portion of the individual macroalgae plants leaving the rooting portion of the macroalgae in place in a majority of the individual plants. Again, while it may be unavoidable that some macroalgae may be completely uprooted during the harvesting process, it is preferred that that macroalgae be cut or similarly harvested such that the upper portions of the plant are removed and the rooting portion of the plant is left behind for further growth production. Thus, in specific embodiments, harvesting can comprise separating the upper portion of the macroalgae from the rooting portion of the macroalgae at some point below the surface of the saltwater growth medium. Specifically, harvesting can comprise removing an average of about 10% to about 50% of the mass of the macroalgae. In other words, about 10% to about 50% of the total mass of individual macroalgae plants are cut away from the root portion during harvesting leaving about 50% to about 90% of the individual macroalgae plant (including the rooting portion) in place and actively growing. The unintended removal of entire plants preferably is minimal such that it does not affect the total harvest percentages. In other embodiments, the percentage of the macroalgae removed in a specific harvest can be about 10% to about 40% by mass, about 15% to about 35%, or about 20% to about 30% by mass.

After harvest, the macroalgae may undergo further processing to prepare the macroalgae for further uses. In particular embodiments, it is useful to separate the calcium carbonate-containing exoskeleton from the plant portion (i.e., the organic material) of the macroalgae. This may be achieved by any method useful for separating organic and inorganic materials. Since the exoskeleton is basically a limestone coating on the organic plant parts (particularly the thallus)—which may be known in the art as "marl"—somewhat destructive means can be required to separate the exoskeleton from the organic plant parts. In some embodiments, a grinder or similar device may be used. Certain examples of grinders useful in the invention are those available from Prater-Sterling (Bolingbrook, Ill.—see, http://www.prater-sterling.com).

Although grinding alone may be a sufficient means to structurally separate the exoskeleton from the organic plant parts, further separation means may be employed to effectively isolate the sum of the exoskeleton parts from the sum of the organic plant parts. Such further separation may be carried out using any means known in the art for separating items, such as means for separating items of differing densities. The calcium carbonate exoskeleton typically has a density of about 2.7 to 2.8 g/cc, whereas the organic plant portion of the macroalgae typically has a density of about 0.8 to 1.1 g/cc. Thus, water separation means may be used to separate and isolate the two materials. Such separation may include the use of a hyper-saline solution to facilitate the rapid and efficient separation of the exoskeleton and the plant parts. For example, low cost, high salinity water can be produced by evaporation in ponds to achieve salt water with salt contents ranging from that of typical seawater (e.g., about 3.5% salinity) to saturated (e.g., about 25% salinity) with corresponding densities of 1.03 g/cc to 1.19 g/cc. In preferred embodiments, the separation medium can have a salt content of about 14% and a density of about 1.10 g/cc. Such separation techniques can be carried using any suitable apparatus, such as a cylindrical cone bottom tank or other similar tank available from Chem-Tainer Industries, Inc., West Babylon, N.Y.

After separation, the separated components can go through further processing. The calcium carbonate exoskeleton may be gathered and directed to multiple end uses. For example, at least a portion of the exoskeleton may be recycled back into a saltwater growth medium as a calcium carbonate source. In localized facilities, the calcium carbonate can be recycled basically in a closed system (i.e., calcium carbonate from the saltwater growth medium forms the exoskeleton on the macroalgae, is harvested with the macroalgae, is separated from the macroalgae, and is recycled back into the same pond for use again as a calcium carbonate source). In other embodiments, calcium carbonate from the exoskeleton may be gathered and recycled into different macroalgae production systems. In further embodiments, the calcium carbonate exoskeleton may be used or sold for other purposes, such as an additive in the production of concrete.

The organic plant portions of the harvested and separated macroalgae also may undergo further processing. For example, methods may be employed (including any known, standard industrial techniques) to remove salt content from the macroalgae. Specifically, the use of rolling press or other water extraction and successive rinses may be employed to minimize freshwater consumption. After any desired salt removal and final rolling press or other water extraction, the macroalgae may be dried. For example, it could be simply spread on flat, dry land areas to dry in the sun. In some embodiments, areas covered with compacted calcium carbonate may be used. Of course, any other method for drying plant parts may be used. Preferably, the macroalgae are dried to a moisture content in the range of about 1% to about 20%, about 2% to about 17%, about 3% to about 15%, about 4% to about 12%, or about 5% to about 10%, based on the total weight of the macroalgae. These approaches minimize energy consumption, water consumption, and cost. Moreover, such processes are well suited for use in the geographic locations where the methods of the invention are believed to be most suited—e.g., hot dry climates, such as west Texas.

In some embodiments, the organic plant portion of the macroalgae may be directed to an end-use process or composition. Examples of end-use processes can include various types of energy production processes, such as direct combustion of the macroalgae organic plant portion (or parts thereof) to produce electricity. Another end-use process may be a biofuel conversion process. Still another end-use process may be conversion to chemical compounds, such as by pyrolysis. A further end-use process could be production of food or food supplements. Thus, still further processing of the macroalgae may be provided, such as separating the macroalgae organic part into its component parts—i.e., protein, carbohydrate, and oil. The protein portions may be isolated and used in various nutritive compositions. The carbohydrate and oil portions may be used in energy production, such as direct combustion to form electrical energy. Otherwise, these portions may be used in other energy production methods, such as conversion to biofuel. Further, these portions could be converted to other chemicals via methods such as pyrolysis. An example of a method that may be useful in separating the organic material into is separate components is the use of high pressure screw extractors and solvent extractors similar to those used in processing soy beans and soy products, wherein the dry biomass is chopped or ground into fine particles and chemically treated to disrupt the cell membranes of the biomass. Oils and proteins are separated from the cell membranes and other carbohydrates using known solvent and other chemical and chemico-physical separation processes. Newer, solvent free methods are also applicable such as detailed in U.S. Pat. No. 7,112,688. Isolated carbohydrates can be used as a fuel product and provided to various power generation plants. Oils/lipids can be provided to various bio fuel producers. Proteins can be used in specialty food products and other protein based consumer products.

After each harvest, it can be useful to perform one or more tests on the saltwater growth medium to ensure chemical properties remain in desired ranges. For example, the pH, nitrogen, phosphate, potassium, calcium, and trace chemical levels can be tested, such as by any suitable techniques recognized in the art. In some embodiments, an off-the-shelf assay may be used. In other embodiments, such evaluation can be carried out using permanent in-place, ion selective electrode monitors, such as noted previously. If adjustments are required, the chemical composition of the growth medium can be adjusted by appropriate additions of chemicals. When the carbonate concentrations fall below preferred levels due to calcium depletion from algae growth, or the salt content rises above preferred levels due to water evaporation, the levels can be adjusted by circulating water between the pond and any general water source, such as a ground water saline aquifer or a seawater source. Additionally, calcium bicarbonate generated from calcium carbonate recycled from algae processing can be added. Further, any means described herein may be applied at this time to balance the chemical composition of the growth to be within the desired parameters.

The methods and systems of the present invention can be characterized by the surprising high mass of macroalgae that may be produced over a given area of land. In specific embodiments, the combination of the saltwater growth medium that is used, the type of macroalgae that is used, and the open pond system that is used can provide for a total macroalgae production of at least about 10 metric tons of macroalgae per acre per year. In other embodiments, the invention can provide for a total macroalgae production of at least about 20 metric tons, at least about 30 metric tons, at least about 40 metric tons, at least about 50 metric tons, at least about 60 metric tons, at least about 70 metric tons, at least about 80 metric tons, at least about 90 metric tons, at least about 100 metric tons, at least about 125 metric tons, at least about 150 metric tons, at least about 175 metric tons, or at least about 200 metric tons based on the total weight of the macroalgae. In other embodiments, the invention can provide for macroalgae production of about 10 metric tons to about 250 metric tons, about 20 metric tons to about 200 metric tons, about 30 metric tons to about 150 metric tons, about 40 metric tons to about 125 metric tons, or about 50 metric tons to about 100 metric tons of total macroalgae per acre per year. As the macroalgae of the invention typically grow an exoskeleton, the foregoing amounts may include the inorganic exoskeleton plant portion and the organic plant portion. It is expected that the inorganic exoskeleton would account for roughly 40% to 60% by weight, 45% to 55% by weight, or about 50% by weight of the total weight of the macroalgae. Thus, the macroalgae production also may be described in terms of only the organic plant portions of the macroalgae that may be directed to specific uses. In some embodiments, macroalgae production in relation to the organic plant portion (mass dried as described herein) can be at least about 5 metric tons per acre per year, at least about 10 metric tons per acre per year, at least about 15 metric tons per acre per year, at least about 20 metric tons per acre per year, at least about 25 metric tons per acre per year, at least about 50 metric tons per acre per year, at least about 75 metric tons per acre per year, or at least about 100 metric tons per acre per year. In further embodiments, macroalgae production in relation to the organic plant portion (mass dried as described herein) can be about 10 metric tons per acre per year to about 120 metric tons per acre per year, about 15 metric tons per acre per year to about 100 metric tons per acre per year, about 20 metric tons per acre per year to about 80 metric tons per acre per year, or about 30 metric tons per acre per year to about 60 metric tons per acre per year. The noted production rates may relate to total actual macroalgae growth available for harvest or may relate to total actual harvested growth (i.e., the production amount taken from the ponds for further processing and/or use.

Additionally, the methods and systems of the invention may be characterized by the surprising growth rates that are obtained when using the specific combination of factors described herein. As shown in the appended examples, the growth of algae under conditions described herein is not a simple, commonplace matter. Moreover, the present invention has established methods and systems that not only allow for growth of macroalgae under extreme conditions but provide for exceptional growth beyond what would be expected in light of the known art. For example, in specific embodiments, the invention provides methods and systems wherein a macroalgae growth rate of at least about 2 $g/m^2/day$ is obtained (i.e., grams of macroalgae per $m^2$ of pond surface area per day). In further embodiments, the macroalgae growth rate may be at least about 5 $g/m^2/day$, at least about 10 $g/m^2/day$, at least about 15 $g/m^2/day$, at least about 20 $g/m^2/day$, at least about 25 $g/m^2/day$, at least about 50 $g/m^2/day$, at least about 75 $g/m^2/day$, at least about 100 $g/m^2/day$, or at least about 125 $g/m^2/day$. In further embodiments, macroalgae growth rates may be in the range of about 5 $g/m^2/day$ to about 135 $g/m^2/day$, about 10 $g/m^2/day$ to about 125 $g/m^2/day$, about 15 $g/m^2/day$ to about 110 $g/m^2/day$, about 20 $g/m^2/day$ to about 100 $g/m^2/day$, or about 25 $g/m^2/day$ to about 75 $g/m^2/day$. The foregoing growth rates can relate to the total macroalgae growth independent of whether the growth is actually harvested.

VI. Macroalgae Production Systems

In another aspect, the present invention can provide specific macroalgae product systems that can be designed and implemented for use in various geographic locations. The macroalgae production system provides the specific components needed to practice biomass production in a sustainable, economically viable manner. Moreover, the macroalgae production system can be used in many areas of the world where many types of plant growth is limited and/or where access to end products arising from the macroalgae (e.g., nutritive material and energy production) is not abundant.

In certain embodiments, the invention can provide a macroalgae production system comprising the following: a saltwater growth medium container having therein a soil component; actively growing macroalgae at least partially rooted in the soil component; and a saltwater growth medium having a specific composition. Any of the further materials described herein, such as any and all components discussed in relation to the description of a saltwater growth containment system and/or an open pond system, may also be encompassed by the macroalgae production system of the invention.

In some embodiments, the macroalgae production system may be expressly characterized by the nature of the components thereof. For example, a production system according to the invention incorporating a saltwater growth medium as described herein could be clearly distinguished from a natural pond having water therein that does not meet the chemical composition requirements of the present invention. Still further, the production system can be distinguished by the nature of the macroalgae being grown therein. In particular, the macroalgae production system can be distinguished from known art by the unique combination of materials gathered for use in the system. In particularly, it is believed that the known art does not encompass the unique combination of a an open pond system wherein macroalgae as described herein are grown and harvested in a sustainable, economically viable manner using a growth medium that is specifically formulated to meet the unique needs of the macroalgae and to be highly compatible with the surround environment wherein the macroalgae production system is located.

VII. End Use of Macroalgae Organic Material

As noted above, the organic portion of the macroalgae biomass produced according to the present invention can be directed to a number of different end uses. In particular embodiments, the macroalgae biomass can be used as a fuel for power generation, as a raw product to produce bio fuel, or as a protein source for use as animal feed.

In some embodiments, the invention can provide a process for renewable generation and use of biomass. For example, such process can comprise the following: producing macroalgae as described herein; processing the macroalgae to produce a dry biomass; isolating proteins from the dry biomass; and processing the proteins into an animal feed for use with stock animals. Optional, further steps could include the following: collecting waste products from the stock animals and processing the waste products into fertilizer; and adding the fertilizer to an open pond system according to the invention to supplement the composition of the saltwater growth medium contained therein.

In other embodiments, the invention can provide a process for production of macroalgae based bio-fuel products comprising: producing macroalgae as described herein; processing the macroalgae to produce a dry biomass; and processing the dry biomass with hydrogen in a pyrolysis system having bio-fuel products as a byproduct.

In further embodiments, the invention can provide a process for production of macroalgae based bio-fuel products comprising: growing macroalgae as described herein; processing the macroalgae to produce a dry biomass; and producing synthesis gas with the dry biomass in an IGCC plant.

Optionally, carbon dioxide from the synthesis gas generation may be used to grow macroalgae.

In still other embodiments, the invention can provide a process for power generation, comprising: growing macroalgae as described herein; processing the macroalgae into a dry biomass; fluidizing the dry biomass with substantially pure oxygen; and combusting the fluidized biomass and oxygen in a transpiration cooled combustor. In further embodiments, the methods optionally can include one or more of the following steps: producing steam in a multi-stage heat exchanger integral to the transpiration cooled combustor; generating electrical power from steam; cooling exhaust gases from the transpiration cooled combustor to close to ambient conditions; collecting exhaust gas carbon dioxide from the transpiration cooled combustor and utilizing the carbon dioxide in the production of macroalgae biomass.

In some embodiments, the invention can provide an integrated system that produces a high yield biomass (i.e., the macroalgae described herein), that can be separated into carbohydrates, proteins, and oils which in turn can be used in electrical power generation, agriculture, food products, and chemical products.

In some embodiments, macroalgae produced according to the invention can be provided as a dry biomass for further use. For example, the dry biomass (formed from the organic portions of the macroalgae) can be processed with hydrogen and/or high temperature steam in a pyrolysis refinery to produce various biofuel products. Oxygen can be removed from the pyrolysis process using various oxygen absorbing materials, such as aluminum powder. Pyrolysis of biomass to produce biofuels is generally described in the current art to produce oxygenated biofuels such as esters and higher boiling points fuels such as biodiesel. Absorbing oxygen and adding hydrogen in this embodiment will yield pure hydrocarbon fuels which are direct chemical analogues of petroleum derived fuels. Lower hydrogen levels and temperatures will produce hydrocarbons such as diesel, but additional hydrogen and higher temperatures will produce lighter hydrocarbons such as gasoline.

In other embodiments, macroalgae produced according to the invention can be used as a fuel source in an Integrated Gasification Combined Cycle (IGCC) plant to produce synthesis gas (syngas). IGCC plants have been used widely in the coal industry to turn coal into syngas. For use in the present invention, existing IGCC plants can be modified such that the coal feed is replaced with a whole macroalgae or macroalgae hydrocarbon biomass residue feed. Further, lower oxygen feed levels are used, and the slag lockhopper is not needed. Oxygen is provided to the IGCC plant from an air separation system, such as a standard industrial air separation unit. The IGCC plant produces synthesis gas (a mixture of carbon monoxide and hydrogen), carbon dioxide, and Hydrogen.

Syngas can be used in a Fischer Tropsch plant to produce fuel products. The Fischer-Tropsch process (or Fischer-Tropsch Synthesis) is a catalyzed chemical reaction in which synthesis gas is converted into liquid hydrocarbons of various forms. The most common catalysts are based on iron and cobalt, although nickel and ruthenium have also been used. The principal purpose of this process is to produce a synthetic petroleum substitute, typically from coal, natural gas or biomass, for use as synthetic lubrication oil or as synthetic fuel. This synthetic fuel runs trucks, cars, and some aircraft engines. The Fischer Tropsch process with biomass produced syngas is detailed in U.S. Pat. No. 6,133,328, which is incorporated herein by reference.

In other embodiments, an integrated system for renewably producing energy from macroalgae can include: biomass (which can be macroalgae that is produced as provided herein or may be a biomass obtained from another source); a fuel injector; a transpiration cooled combustion unit; and an exhaust gas separation unit. The combustion unit can be a zero emission power generation unit and can include a transpiration cooled combustor, a fuel injection system, and an exhaust gas separation system. Additional modules or systems can be included with the combustion unit, including a steam power generation unit, air separation units, and common waste scavenging systems.

In operation oxygen is supplied to the combustor via a fuel injection system, which provides fluidized fuel and oxygen to the combustor at pressures above the combustion pressure. The fuel can be dried biomass, such as macroalgae produced as described herein. Dried biomass can be processed to a fine powder or other form suitable for fluidization. Fluidized biomass and oxygen are consumed in a pressurized combustion process at temperatures well above traditional coal fired combustion chambers.

In preferred embodiments, the use of a transpiration combustor allows the combustion to occur at temperatures and pressures far in excess of traditional combustion chambers. These high pressures and temperatures allow the combustor to burn a variety of fuel types, including fluidized biomass (e.g., macroalgae), as well as other materials, such as various grades and types of coal, wood, oil, fuel oil, natural gas, bio-fuel, and solid waste refuse.

EXPERIMENTAL

The present invention now is described with reference to various examples. The following examples are not intended to be limiting of the invention and are rather provided as exemplary embodiments.

Example 1

Evaluation of Microalgae and Macroalgae Growth Using Inventive Saltwater Growth Medium Multiple species of microalgae and macroalgae were evaluated under identical conditions to determine the ability of the different types of algae to grow using the inventive saltwater growth medium. The composition of the saltwater growth medium is provided below in Table 3. Given the amount of calcium bicarbonate present in the composition, the free calcium available in solution was calculated to be approximately 1,250 mg/L. The solution pH for the saltwater growth medium was 8.5. The same saltwater growth medium was used for all indoor and outdoor tests with the microalgae and the macroalgae.

First, the microalgae species noted below in Table 4 were grown indoors in glass tanks (5 gallon volumes) covered with glass tops. There was no soil present in the glass tanks. Indoor lighting was provided with high intensity sunlight balanced fluorescent lights. Indoor temperatures were kept at about 20° C. to about 27° C. All of the noted microalgae species grew well under the noted conditions.

TABLE 3

| Saltwater Growth Medium Composition | |
|---|---|
| Material | Amount (mg/L) |
| Sodium chloride | 24,000 |
| Calcium bicarbonate | 5,000 |
| Sulfate | 4,000 |
| Nitrogen | 25 |
| Silicon | 6 |
| Phosphorus | 2 |
| Iron | 2 |
| Manganese | 0.1 |

TABLE 3-continued

Saltwater Growth Medium Composition

| Material | Amount (mg/L) |
|---|---|
| Cobalt | 0.1 |
| Zinc | 0.01 |
| Molybdenum | 0.005 |
| Copper | 0.005 |

TABLE 4

Microalgae Species Evaluated Under the Inventive, Outdoor Growth Conditions and by the Comparative, Indoor Growth Conditions

| | |
|---|---|
| Anabaena cylindrica | Phaeodactylum tricornutum |
| Ankistrodesmus | Pleurochrysis carterae |
| Botryococcus braunii | Porphyridium cruentum |
| Chalamydomonas Reinhardtii | Scenedesmus dimorphus |
| Chlorella | Scenedesmus obliquus |
| Crpthecodinium cohnii | Scenedesmus quadricauda |
| Cyclotella | Schizochytrium |
| Dunaliella salina | Spirogyra |
| Dunaliella tertiolecta | Spirulina maxima |
| Euglena gracilis | Spirulina platensis |
| Hantzschia | Stichococcus |
| Nannochloris | Synechoccus sp. |
| Nannochloropsis | Tetraselmis maculate |
| Neochloris oleoabundans | Tetraselmis suecica |
| Nitzschia | Thalassiosira pseudonana |

As a comparative, the same microalgae species were grown in outdoor ponds according to the invention. The outdoor ponds were formed directly in the ground with natural soil forming the sides and walls thereof. The water composition was again that shown in Table 3. The ponds were approximately 210 feet in diameter (about one acre) and ranged in depth from about three to about four feet. Soil pH varied from about 8.2 to about 8.4. All ponds were uncovered. Outdoor water temperature ranged from about 4° C. to about 20° C. In all cases, the microalgae rapidly died when evaluated under the conditions according to the invention using the open pond system outdoors and the water composition of Table 3.

Several species of macroalgae also were evaluated in this example. In each case, inoculums were begun and then moved to the outdoor ponds for growth evaluation under the test conditions. Again, the water composition was that shown in Table 3. The ponds were approximately 210 feet in diameter (about one acre) and ranged in depth from about three to about four feet. Soil pH varied from about 8.2 to about 8.4. All ponds were uncovered. Outdoor water temperature ranged from about 4° C. to about 20° C. The macroalgae species evaluated are shown below in Table 5. Also indicated therein are the results of the evaluation.

TABLE 5

Macroalgae Species Evaluated Under the Inventive, Outdoor Growth Conditions

| Macroalgae | Results |
|---|---|
| Chara vulgaris | Grew extremely well over the entire 12 month test period |
| Ulva | Survived the transfer and grew slowly |
| Padina | Survived the transfer and grew slowly |
| Gracilaria | Died without significant growth |
| Chondria | Died without significant growth |
| Gelidiella | Died without significant growth |
| Rhodonata | Died without significant growth |
| Sargassum | Died without significant growth |

The above test results confirmed that microalgae were not suited at all for use in biomass production under the conditions used in the present invention. The testing further indicated that only specific types of macroalgae were suited for the rapid, sustained growth needed to achieve economical, long-term biomass production. Moreover, the testing indicated that the types of macroalgae that were most useful under the inventive test conditions where the species that formed a protective exoskeleton.

Example 2

Growth Rate of Macroalgae According to the Invention Versus Microalgae Grown Under Prior Art Conditions Based upon the understanding of the prior art, macroalgae were not considered valuable for biomass production because of the low growth rate relative to microalgae. To evaluate this prior art assumption in light of the advancements of the present invention, the growth rate of *Nanochloropsis* microalgae was evaluated under normal, prior art, clean laboratory conditions. The *Nannochloropsis* was not evaluated using the saltwater growth medium of the present invention because, as shown in Table 4 above, *Nannochloropsis* was determined to not grow under the inventive conditions.

As a comparative, *Chara vulgaris* macroalgae was grown in an open pond system according to the invention using a saltwater growth medium as shown in Table 3 above and pond conditions described in Example 1. Growth rate of the *Nannochloropsis* and the *Chara vulgaris* was evaluated in grams per square meter per day. The test results over an 18 day period are shown in Table 6 below, wherein negative numbers indicate algae death rates instead of growth rates.

TABLE 6

Comparative Growth of Microalgae and Macroalgae

| Day Number | Nannochloropsis Microalgae Growth (g/m²/day) | Chara vulgaris Growth (g/m²/day) |
|---|---|---|
| 2 | 80 | 9 |
| 4 | 80 | 18 |
| 6 | 100 | 30 |
| 8 | 80 | 35 |
| 10 | −60 | 35 |
| 12 | −80 | 33 |
| 14 | −100 | 31 |
| 16 | −80 | 30 |
| 18 | −20 | 29 |
| Total Growth Over 18 days | 0 | 250 |

As seen above, the *Nannochloropsis* microalgae had an early growth pattern that exceeded that of the *Chara vulgaris* macroalgae. After eight days, however, the microalgae began to die, and after 18 days, all of the rapid growth that was experienced was negated as the total biomass achieved was zero. The *Chara vulgaris* macroalgae, on the other hand, required a few extra days to become established, but this was not surprising since the macroalgae is a rooting species and would be expected to require an initial amount of time to become well established. After this initial period, though, the macroalgae achieved an excellent, sustained biomass production. This clearly shows that while microalgae can provide short term, explosive growth, sustained growth potential is almost entirely absent. This further illustrates the difficulties in the art in achieving efficient, economical biomass production with microalgae—the lack of potential for on-going growth. To achieve results of any use, the microalgae must be completely harvested with no further potential. On the other hand, the macroalgae provides sustained growth and allows for regular harvesting of excellent amounts of biomass with continuous production or production that is interrupted only on scheduled intervals. Moreover, the macroalgae provided this excellent result in an open pond system with no control over competitors (e.g., bacteria, predators, and the like), and the microalgae were completely unable to grow in this same environment, which is much more economical and simpler to control.

The surprising effects related to total growth over an 18 day period highlight the various benefits of the present invention. In particular, macroalgae (such as *Chara*) can provide long term high yield in open unlined dirt ponds, unlike microalgae (which die off after short periods of time). The saltwater growth medium of the present invention (such as the exemplary formula in Table 3) with high calcium bicarbonate content has shown that high algae growth rates can be achieved without the need for expensive $CO_2$ bubbling systems. The high pH and high carbonate water rapidly absorbs and holds $CO_2$ long enough for the algae to absorb it, unlike lower pH and/or lower carbonate water. The surprising effects on growth of macroalgae according to the invention are illustrated below in Example 3. The high soil pH in the open pond systems of the invention helps maintain the high water pH, which helps absorb $CO_2$ from the air and generate and maintain high calcium bicarbonate levels which accelerate macroalgae growth. It has been found according to the present invention that macroalgae that form an exoskeleton in hard water, such as *Chara*, grows faster and in a more pure form with less competition with calcium bicarbonate. The calcified form of *Chara* is highly resistant to predation and even to chemicals which would normally kill it.

Example 3

Growth Rate of *Chara* as a Function of Growth Medium Calcium Bicarbonate Concentration Testing was carried out to determine the overall effect of the increased calcium provided in the saltwater growth medium of the present invention. Growth data for one week was gathered while growing *Chara vulgaris* in an indoor glass tank with a soil-lined bottom. Testing was carried out at a temperature of 80° F. with simulated sunlight. Growth rate data measurements were started when algae growth had reached sufficient levels such that the light intensity at the bottom of the tank was 30% of the light intensity at the surface. The saltwater growth medium was identical to the formulation shown in Table 3 with the exception of the amount of calcium bicarbonate in the growth medium. This single variable was changed as shown below in Table 7 along with the *Chara* growth rate observed at the noted calcium bicarbonate concentration. This data is illustrated graphically in FIG. 1.

TABLE 7

Chara Growth as a Function of Calcium Bicarbonate Concentration

| Calcium Bicarbonate Concentration (mg/L) | Chara Growth Rate (g/m²/day) |
|---|---|
| 0 | 0 |
| 1,000 | 1.5 |
| 2,000 | 3 |
| 5,000 | 16 |
| 20,000 | 14 |
| 50,000 | 11 |

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims Although specific terms are employed herein, they are used in a generic and descriptive sense only and not for purposes of limitation.

The invention claimed is:

1. A method of producing macroalgae comprising growing the macroalgae in an open pond system comprising a saltwater growth medium having a pH of at least about 7.5, a calcium content of at least about 500 mg/L, and a content of sodium and chlorine such that the ratio of the combination of sodium and chlorine to the calcium in the saltwater growth medium is greater than 0 but less than about 50.

2. The method of claim 1, wherein the macroalgae is a macroalgae classified in the order Charales.

3. The method of claim 2, wherein the macroalgae is a macroalgae classified in the family Characeae or Clavatoraceae.

4. The method of claim 3, wherein the macroalgae is a macroalgae classified in a genus selected from the group consisting of *Aclistochara, Amblyochara, Amphorochara, Chara, Charites, Croftiella, Gobichara, Grambastichara, Grovesichara, Gyrogona, Harrisichara, Hornichara, Lamprothamnium, Lamprothamnus, Latochara, Lychnothamnus, Maedleriella, Maedlerisphaera, Mesochara, Microchara, Multispirochara, Nemegtichara, Neochara, Nitella, Nitellopsis, Nodosochara, Obtusochara, Peckichara, Peckisphaera, Piriformachara, Platychara, Raskyaechara, Sphaerochara, Stephanochara, Tectochara, Tolypella*, and combinations thereof.

5. The method of claim 1, wherein the macroalgae is selected from the group consisting of *Chara aculeolata, Chara alopecuroidea, Chara alopecuroides, Chara angarica, Chara arrudensis, Chara aspera, Chara asperula, Chara australis, Chara baltica, Chara batrachioides, Chara batrachosperma, Chara baueri, Chara benthamii, Chara bharadwajee, Chara biformis, Chara brachypus, Chara braunii, Chara bulbillifera, Chara canescens, Chara capillacea, Chara capillaris, Chara capitata, Chara ceratophylla, Chara chidamuensis, Chara columnaria, Chara congesta, Chara conimbrigensis, Chara connivens, Chara connivetifragilis, Chara contraria, Chara corallina, Chara coronata, Chara crassicaulis, Chara crinita, Chara curta, Chara delicatula, Chara denudata, Chara desmacantha, Chara dichopitys, Chara diffusa, Chara dissoluta, Chara distorta, Chara drummondii, Chara eboliangensis, Chara ecklonii, Chara elongata, chara equisetifolia, Chara escheri, Chara fallax, Chara fibrosa, Chara firma, Charaflexillis, Chara foetida, Chara foliolata, Chara fragifera, Chara fragilifera, Chara fragilis, Chara fulcrata, Chara galioides, Chara gelatinosa, Chara globularis, Chara glomerata, Chara gracilis, Chara gymnophylla, Chara gymnopitys, Chara gymnopus, Chara halina, Chara hansenii, Chara hedwigii, Chara heterophylla, Chara hirta, Chara hispida, Chara hookeri, Chara horrida, Chara huangii, Chara hyalina, Chara hydropytis, Chara imperfecta, Chara inconnexa, Chara inconspicua, Chara inflata, Chara intermedia, Chara intertexta, Chara intricata, Chara krausei, Chara leei, Chara leptopitys, Chara leptosperma, Chara leptospora, Chara lhotzkyi, Chara liljebladii, Chara longibracteata, Chara macropogon, Chara maior, Chara major, Chara microphylla, Chara mollusca, Chara montagnei, Chara mucronata, Chara muelleri, Chara muscosa, Chara myriophylla, Chara nolteana, Chara nuda, Chara obtuse, Chara oedophylla, Chara opaca, Chara pachyarthra, Chara palaeofragilis, Chara palaeohungarica,*

*Chara papillata, Chara papulosa, Chara pedunculata, Chara plebeja, Chara polyacantha, Chara polycarpica, Chara polyphylla, Chara polysperma, Chara pouzolsii, Chara preissii, Chara prolifera, Chara psilopitys, Chara pulchella, Chara pusilla, Chara rabenhorstii, Chara refracta, Chara rudis, Chara rusbyana, Chara sadleri, Chara scoparia, Chara setosa, Chara spinescens, Chara squamosa, Chara stelligera, Chara stoechadum, Chara strigosa, Chara stuartiana, Chara submollusca, Chara subtillis, Chara succincta, Chara syncarpa, Chara tenuispina, Chara tenuissima, Chara tomentosa, Chara translucens, Chara trichophylla, Chara vandalurensis, Chara vasiformis, Chara virgata, Chara viridis, Chara visianii, Chara vulgaris, Chara wallichi, Chara wallrothii, Chara zeylanica*, subspecies thereof, varieties thereof, forms thereof, and combinations thereof.

6. The method of claim 5, wherein the macroalgae is selected from the group consisting of *Chara vulgaris* f. *contraria, Chara vulgaris* var. *refracta, Chara vulgaris* f. *paragymnophylla, Chara vulgaris* f. *subhispida, Chara vulgaris* f. *subinermis, Chara vulgaris* var. *gymnophylla, Chara vulgaris* var. *hispidula, Chara vulgaris* var. *vulgaris, Chara vulgaris* Linnaeus, *Chara vulgaris* var. *montana, Chara vulgaris* f. *crispa, Chara vulgaris* var. *contraria, Chara vulgaris* var. *papillata, Chara vulgaris* f. *longibracteata, Chara vulgaris* var. *longibracteata, Chara vulgaris* var. *crassicaulis, Chara vulgaris* var. *denudata, Chara vulgaris* var. *vulgaris* f. *crassicaulis, Chara vulgaris* var. *inconexa* f. *arrudensis, Chara vulgaris* var. *inconnexa, Chara vulgaris* subsp. *squamosa, Chara vulgaris* f. *hispidula, Chara vulgaris* var. *condensata, Chara vulgaris* var. *imperfecta, Chara vulgaris* var. *oedophylla, Chara vulgaris* var. *vulgaris* f. *muscosa*, and combinations thereof.

7. The method of claim 1, wherein the macroalgae is a soil-rooting species.

8. The method of claim 1, wherein the macroalgae is a macroalgae that forms a calcium carbonate-containing exoskeleton in the presence of sufficient calcium ions and carbonate ions.

9. The method of claim 1, wherein the macroalgae is a species recognized by one or more of the common names stonewort, brittlewort, muskgrass, and muskwort.

10. The method of claim 1, wherein the open pond system comprises soil having a pH of at least about 7.5.

11. The method of claim 10, wherein the soil pH is at least about 8.

12. The method of claim 1, wherein the saltwater growth medium has a pH of at least about 8.

13. The method of claim 1, wherein saltwater growth medium has a calcium content of at least about 700 mg/L.

14. The method of claim 13, wherein the saltwater growth medium has a calcium content of at least about 1,000 mg/L.

15. The method of claim 1, wherein the saltwater growth medium has a sulfate content of at least about 1,000 mg/L.

16. The method of claim 1, wherein the saltwater growth medium has a nitrogen content of at least about 6 mg/L.

17. The method of claim 1, wherein the saltwater growth medium has a phosphorus content of at least about 0.5 mg/L.

18. The method of claim 1, wherein the saltwater growth medium has one or more of:
  i. a sodium chloride content of about 3 g/L to about 70 g/L;
  ii. a calcium content of about 500 mg/L to about 50 g/L;
  iii. a sulfate content of about 1 g/L to about 16 g/L;
  iv. a nitrogen content of about 6.25 mg/L to about 100 mg/L;
  v. a silicon content of about 1.5 mg/L to about 24 mg/L;
  vi. a phosphorus content of about 0.5 mg/L to about 8 mg/L; and
  vii. an iron content of about 0.5 mg/L to about 8 mg/L.

19. The method of claim 18, wherein the saltwater growth medium includes the sodium chloride content, the calcium content, the sulfate content, and the phosphorus content.

20. The method of claim 1, wherein the saltwater growth medium has a total salinity of at least about 1% by weight.

21. The method of claim 20, wherein the saltwater growth medium has a total salinity of about 1.5% to about 15% by weight.

22. The method of claim 1, further comprising adding a hydroxide compound to the saltwater growth medium.

23. The method of claim 1, wherein said growing comprises forming a calcium carbonate-containing exoskeleton on at least a portion of the external surface of the macroalgae such that the macroalgae comprise an organic plant portion and an inorganic calcium carbonate-containing exoskeleton portion.

24. The method of claim 23, further comprising harvesting the macroalgae.

25. The method of claim 24, wherein the macroalgae comprises a rooting portion in contact with soil and wherein said harvesting comprises removing only a portion of the individual macroalgae plants leaving the rooting portion of the macroalgae in place in a majority of the individual plants.

26. The method of claim 24, wherein said harvesting comprising separating the upper portion of the macroalgae from the rooting portion of the macroalgae at some point below the surface of the saltwater growth medium.

27. The method of claim 24, wherein said harvesting comprises removing an average of about 10% to about 50% of the mass of the macroalgae.

28. The method of claim 24, wherein said harvesting is carried out when the average shading factor in the open pond system is about 25% to about 75%.

29. The method of claim 24, further comprising separating the calcium carbonate-containing exoskeleton portion from the plant portion of the macroalgae.

30. The method of claim 29, comprising directing the plant portion of the macroalgae to an end-use process.

31. The method of claim 30, wherein said end-use process comprises one or more of an energy production process, a biofuel conversion process, a chemical compound conversion process, and a food or food supplement production process.

32. The method of claim 29, further comprising recycling at least a portion of the calcium carbonate-containing exoskeleton into a saltwater growth medium in an open pond system growing macroalgae.

33. The method of claim 1, wherein the saltwater growth medium in the open pond system has a depth of at least about 2 feet.

34. The method of claim 33, wherein the saltwater growth medium in the open pond system has a depth of about 2 feet to about 8 feet.

35. The method of claim 1, wherein the open pond system further comprises light sensors interspaced therein.

36. The method of claim 35, comprising a least one light sensor located near the surface of the saltwater growth medium and at least one light sensor located near the bottom of the saltwater growth medium.

37. The method of claim 1, wherein the macroalgae grow at a rate of at least about 5 g/m$^2$/day.

38. The method of claim 1, wherein the macroalgae grow at a rate of about 5 g/m$^2$/day to about 135 g/m$^2$/day.

39. The method of claim 1, wherein the macroalgae production is at least about 10 metric tons per acre per year.

40. A method of producing macroalgae comprising:
(a) growing a soil-rooting, exoskeleton-forming macroalgae in an open pond system such that the macroalgae comprise an organic plant portion and an inorganic calcium carbonate-containing exoskeleton portion;
(b) harvesting the macroalgae; and
(c) separating the exoskeleton portion from the plant portion of the macroalgae.

41. The method of claim 40, wherein the macroalgae is a macroalgae classified in the order Charales.

42. The method of claim 41, wherein the macroalgae is a macroalgae classified in the family Characeae or Clavatoraceae.

43. The method of claim 42, wherein the macroalgae is a macroalgae classified in a genus selected from the group consisting of *Aclistochara, Amblyochara, Amphorochara, Chara, Charites, Croftiella, Gobichara, Grambastichara, Grovesichara, Gyrogona, Harrisichara, Hornichara, Lamprothamnium, Lamprothamnus, Latochara, Lychnothamnus, Maedleriella, Maedlerisphaera, Mesochara, Microchara, Multispirochara, Nemegtichara, Neochara, Nitella, Nitellopsis, Nodosochara, Obtusochara, Peckichara, Peckisphaera, Piriformachara, Platychara, Raskyaechara, Sphaerochara, Stephanochara, Tectochara, Tolypella*, and combinations thereof.

44. The method of claim 40, wherein the macroalgae is selected from the group consisting of *Chara aculeolata, Chara alopecuroidea, Chara alopecuroides, Chara angarica, Chara arrudensis, Chara aspera, Chara asperula, Chara australis, Chara baltica, Chara batrachioides, Chara batrachosperma, Chara baueri, Chara benthamii, Chara bharadwajee, Chara biformis, Chara brachypus, Chara braunii, Chara bulbillifera, Chara canescens, Chara capillacea, Chara capillaris, Chara capitata, Chara ceratophylla, Chara chidamuensis, Chara columnaria, Chara congesta, Chara conimbrigensis, Chara connivens, Chara connivetifragilis, Chara contraria, Chara corallina, Chara coronata, Chara crassicaulis, Chara crinita, Chara curta, Chara delicatula, Chara denudata, Chara desmacantha, Chara dichopitys, Chara diffusa, Chara dissoluta, Chara distorta, Chara drummondii, Chara eboliangensis, Chara ecklonii, Chara elongata, chara equisetifolia, Chara escheri, Chara fallax, Chara fibrosa, Chara firma, Chara flexillis, Chara foetida, Chara foliolata, Chara fragifera, Chara fragilifera, Chara fragilis, Chara fulcrata, Chara galioides, Chara gelatinosa, Chara globularis, Chara glomerata, Chara gracilis, Chara gymnophylla, Chara gymnopitys, Chara gymnopus, Chara halina, Chara hansenii, Chara hedwigii, Chara heterophylla, Chara hirta, Chara hispida, Chara hookeri, Chara horrida, Chara huangii, Chara hyalina, Chara hydropytis, Chara imperfecta, Chara inconnexa, Chara inconspicua, Chara inflata, Chara intermedia, Chara intertexta, Chara intricata, Chara krausei, Chara leei, Chara leptopitys, Chara leptosperma, Chara leptospora, Chara lhotzkyi, Chara liljebladii, Chara longibracteata, Chara macropogon, Chara maior, Chara major, Chara microphylla, Chara mollusca, Chara montagnei, Chara mucronata, Chara muelleri, Chara muscosa, Chara myriophylla, Chara nolteana, Chara nuda, Chara obtuse, Chara oedophylla, Chara opaca, Chara pachyarthra, Chara palaeofragilis, Chara palaeohungarica, Chara papillata, Chara papulosa, Chara pedunculata, Chara plebeja, Chara polyacantha, Chara polycarpica, Chara polyphylla, Chara polysperma, Chara pouzolsii, Chara preissii, Chara prolifera, Chara psilopitys, Chara pulchella, Chara pusilla, Chara rabenhorstii, Chara refracta, Chara rudis, Chara rusbyana, Chara sadleri, Chara scoparia, Chara setosa, Chara spinescens, Chara squamosa, Chara stelligera, Chara stoechadum, Chara strigosa, Chara stuartiana, Chara submollusca, Chara subtillis, Chara succincta, Chara syncarpa, Chara tenuispina, Chara tenuissima, Chara tomentosa, Chara translucens, Chara trichophylla, Chara vandalurensis, Chara vasiformis, Chara virgata, Chara viridis, Chara visianii, Chara vulgaris, Chara wallichi, Chara wallrothii, Chara zeylanica*, subspecies thereof, varieties thereof, forms thereof, and combinations thereof.

45. The method of claim 44, wherein the macroalgae is selected from the group consisting of *Chara vulgaris* f. *contraria, Chara vulgaris* var. *refracta, Chara vulgaris* f. *paragymnophylla, Chara vulgaris* f. *subhispida, Chara vulgaris* f. *subinermis, Chara vulgaris* var. *gymnophylla, Chara vulgaris* var. *hispidula, Chara vulgaris* var. *vulgaris, Chara vulgaris* Linnaeus, *Chara vulgaris* var. *montana, Chara vulgaris* f. *crispa, Chara vulgaris* var. *contraria, Chara vulgaris* var. *papillata, Chara vulgaris* f. *longibracteata, Chara vulgaris* var. *longibracteata, Chara vulgaris* var. *crassicaulis, Chara vulgaris* var. *denudata, Chara vulgaris* var. *vulgaris* f. *crassicaulis, Chara vulgaris* var. *inconexa* f. *arrudensis, Chara vulgaris* var. *inconnexa, Chara vulgaris* subsp. *squamosa, Chara vulgaris* f. *hispidula, Chara vulgaris* var. *condensata, Chara vulgaris* var. *imperfecta, Chara vulgaris* var. *oedophylla, Chara vulgaris* var. *vulgaris* f. *muscosa*, and combinations thereof.

46. The method of claim 40, wherein the macroalgae is a species recognized by one or more of the common names stonewort, brittlewort, muskgrass, and muskwort.

47. The method of claim 40, wherein the open pond system comprises soil having a pH of at least about 7.5.

48. The method of claim 47, wherein the soil pH is at least about 8.

49. The method of claim 40, wherein the open pond system comprises a saltwater growth medium having a pH of at least about 7.5 and a calcium content of at least about 500 mg/L.

50. The method of claim 49, wherein the saltwater growth medium further has a content of sodium and chlorine such that the ratio of the combination of sodium and chlorine to the calcium in the saltwater growth medium is greater than 0 but less than about 50.

51. The method of claim 49, wherein the saltwater growth medium has a sulfate content of at least about 1,000 mg/L.

52. The method of claim 49, wherein the saltwater growth medium has a nitrogen content of at least about 6 mg/L.

53. The method of claim 49, wherein the saltwater growth medium has a phosphorus content of at least about 0.5 mg/L.

54. The method of claim 49, wherein the saltwater growth medium has one or more of:
   i. a sodium chloride content of about 3 g/L to about 70 g/L;
   ii. a calcium content of about 500 mg/L to about 50 g/L;
   iii. a sulfate content of about 1 g/L to about 16 g/L;
   iv. a nitrogen content of about 6.25 mg/L to about 100 mg/L;
   v. a silicon content of about 1.5 mg/L to about 24 mg/L;
   vi. a phosphorus content of about 0.5 mg/L to about 8 mg/L; and
   vii. an iron content of about 0.5 mg/L to about 8 mg/L.

55. The method of claim 54, wherein the saltwater growth medium includes the sodium chloride content, the calcium content, the sulfate content, and the phosphorus content.

56. The method of claim 40, wherein the macroalgae comprises a rooting portion in contact with soil, and wherein said harvesting comprises removing only a portion of the individual macroalgae plants leaving the rooting portion of the macroalgae in place in a majority of the individual plants.

57. The method of claim 40, wherein said harvesting comprising separating the upper portion of the macroalgae from the rooting portion of the macroalgae at some point below the surface of the saltwater growth medium.

58. The method of claim 40, wherein said harvesting comprises removing an average of about 10% to about 50% of the mass of the macroalgae.

59. The method of claim 40, wherein said harvesting is carried out when the average shading factor in the open pond system is about 25% to about 75%.

60. The method of claim 40, comprising directing the plant portion of the macroalgae to an end-use process.

61. The method of claim 60, wherein said end-use process comprises one or more of an energy production process, a biofuel conversion process, a chemical compound conversion process, and a food or food supplement production process.

62. The method of claim 40, further comprising recycling at least a portion of the calcium carbonate-containing exoskeleton into a saltwater growth medium in an open pond system growing macroalgae.

63. The method of claim 40, wherein the macroalgae grow at a rate of at least about 5 $g/m^2/day$.

64. The method of claim 40, wherein the macroalgae grow at a rate of about 5 $g/m^2/day$ to about 135 $g/m^2/day$.

65. The method of claim 40, wherein the macroalgae production is at least about 10 metric tons per acre per year.

\* \* \* \* \*